July 9, 1957   R. C. ALDERSON ET AL   2,798,682
AIRCRAFT CONTROL APPARATUS RESPONSIVE TO ANGLE OF ATTACK
Filed Dec. 30, 1948   8 Sheets-Sheet 2
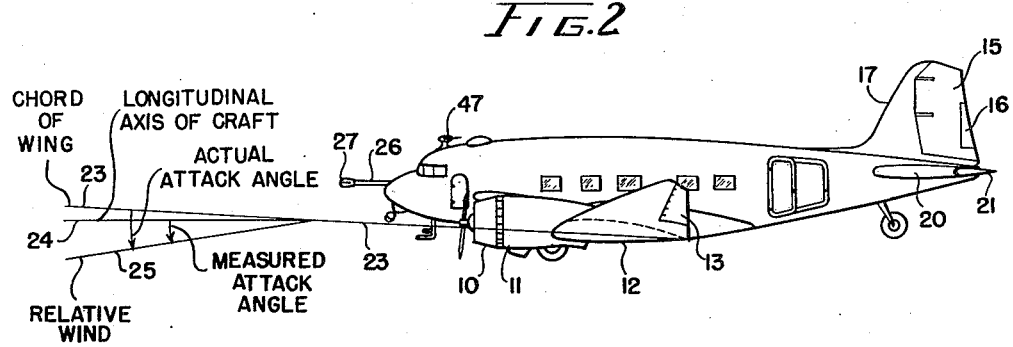
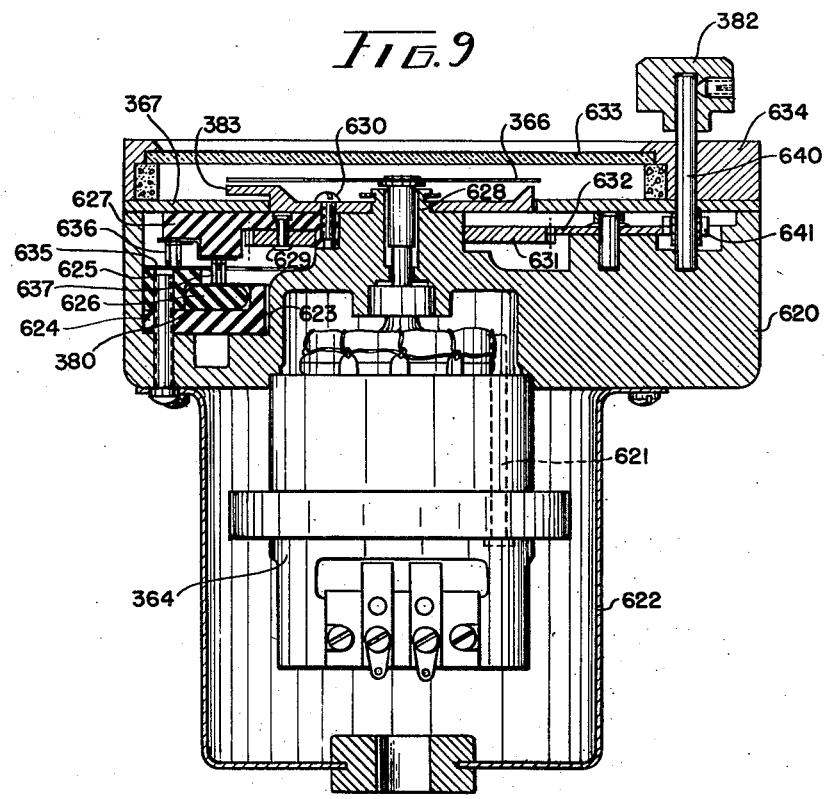
INVENTOR.
OSCAR HUGO SCHUCK
ROSS C. ALDERSON
BY
*George H Fisher*
ATTORNEY

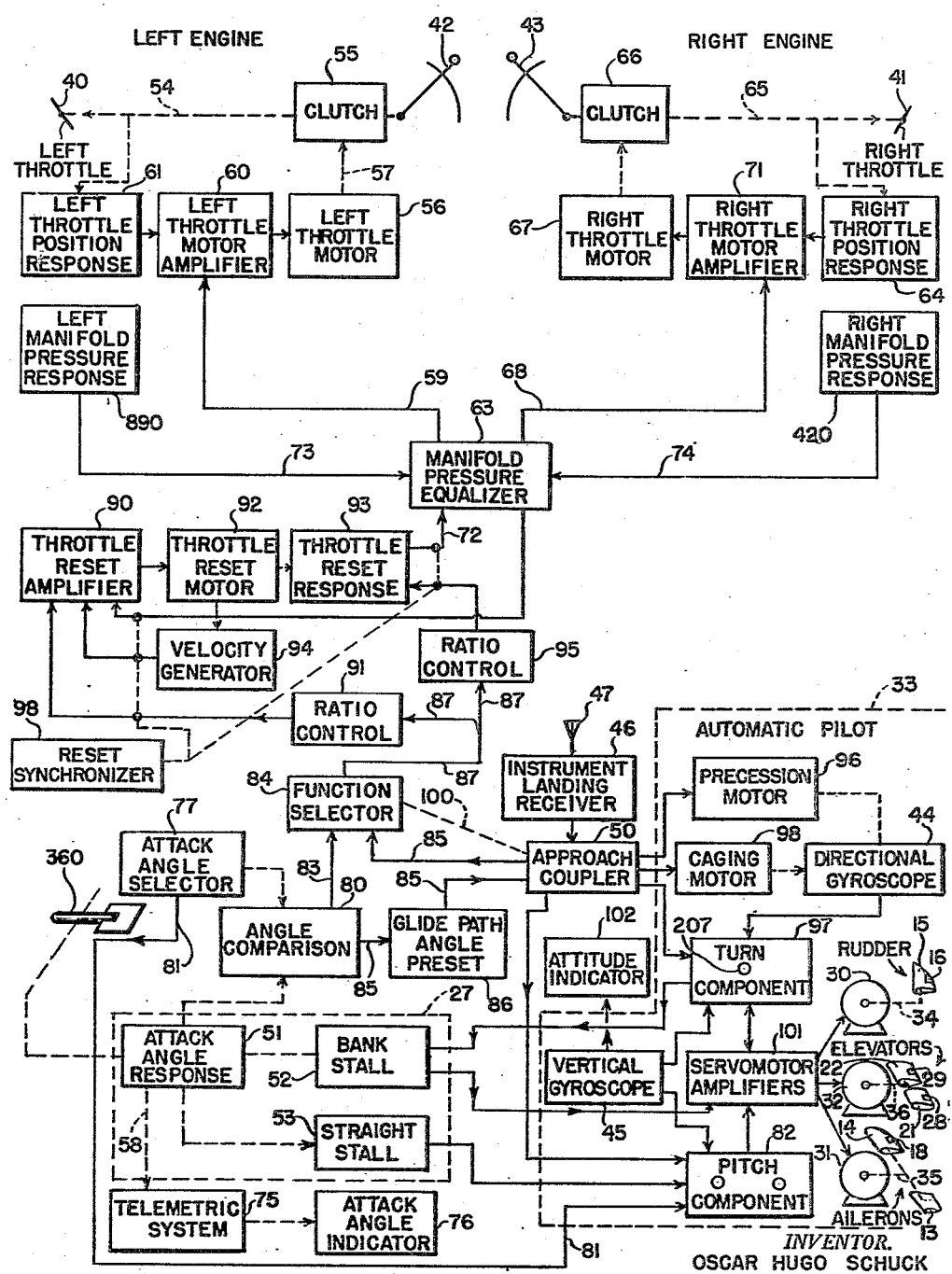

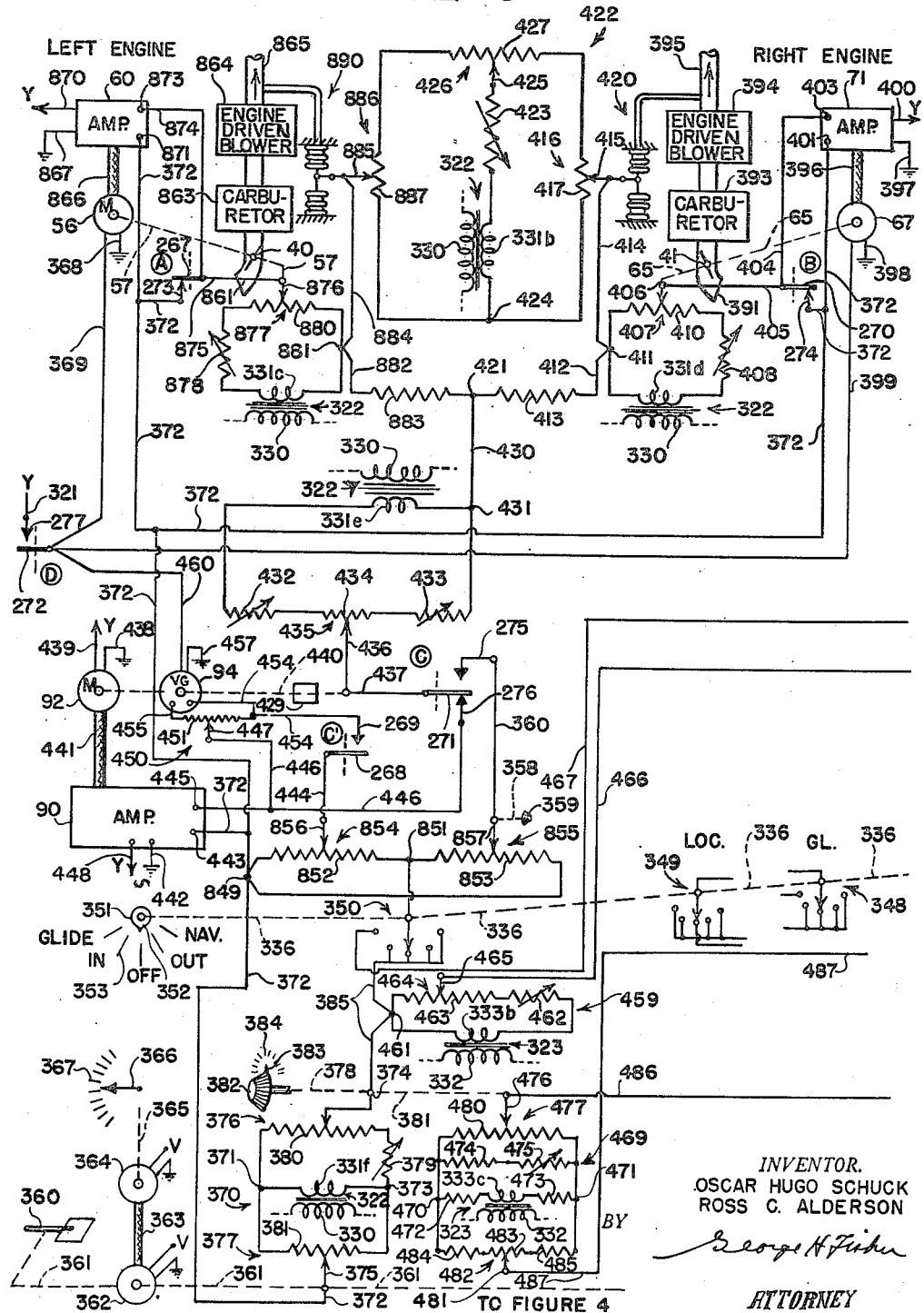

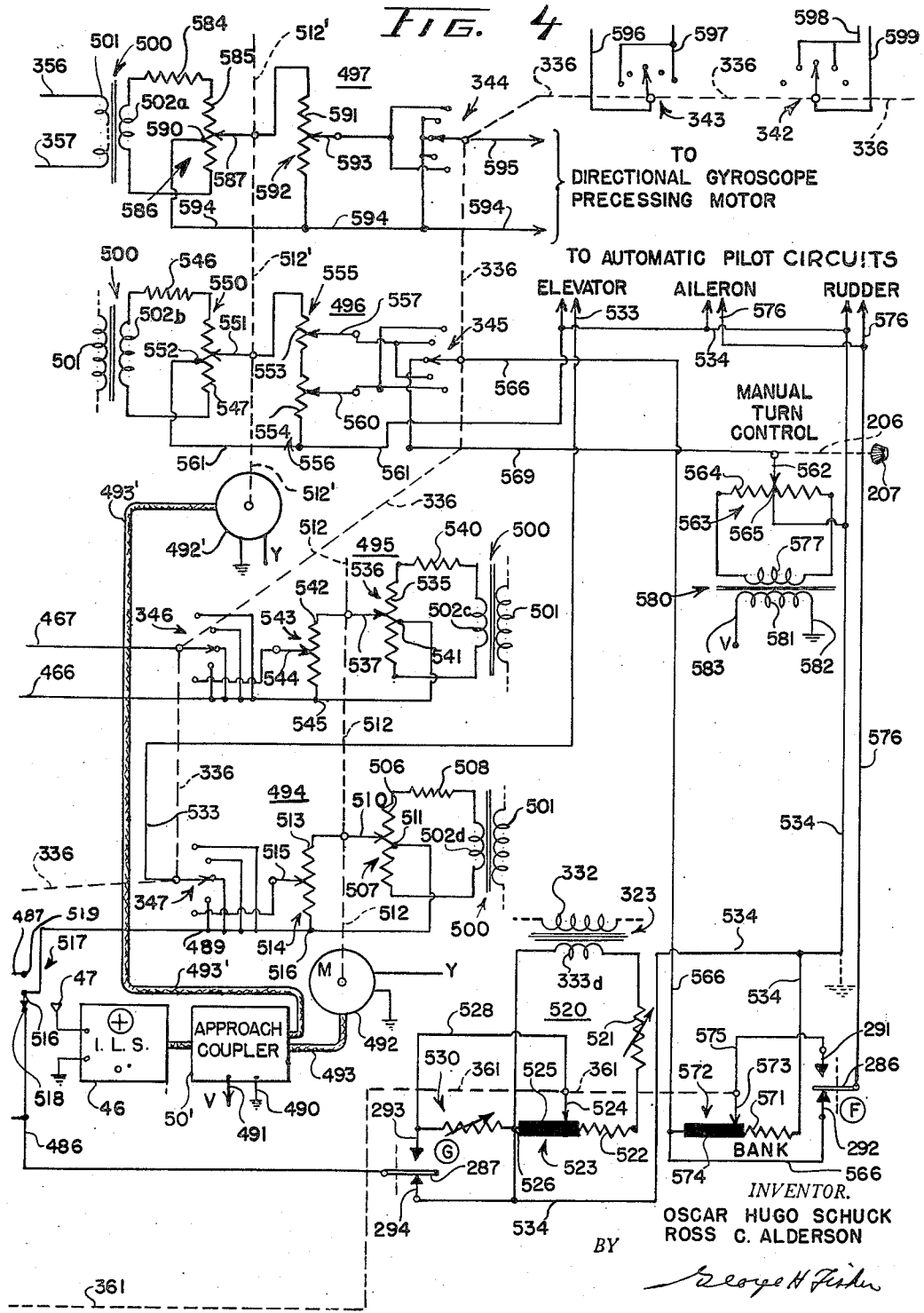

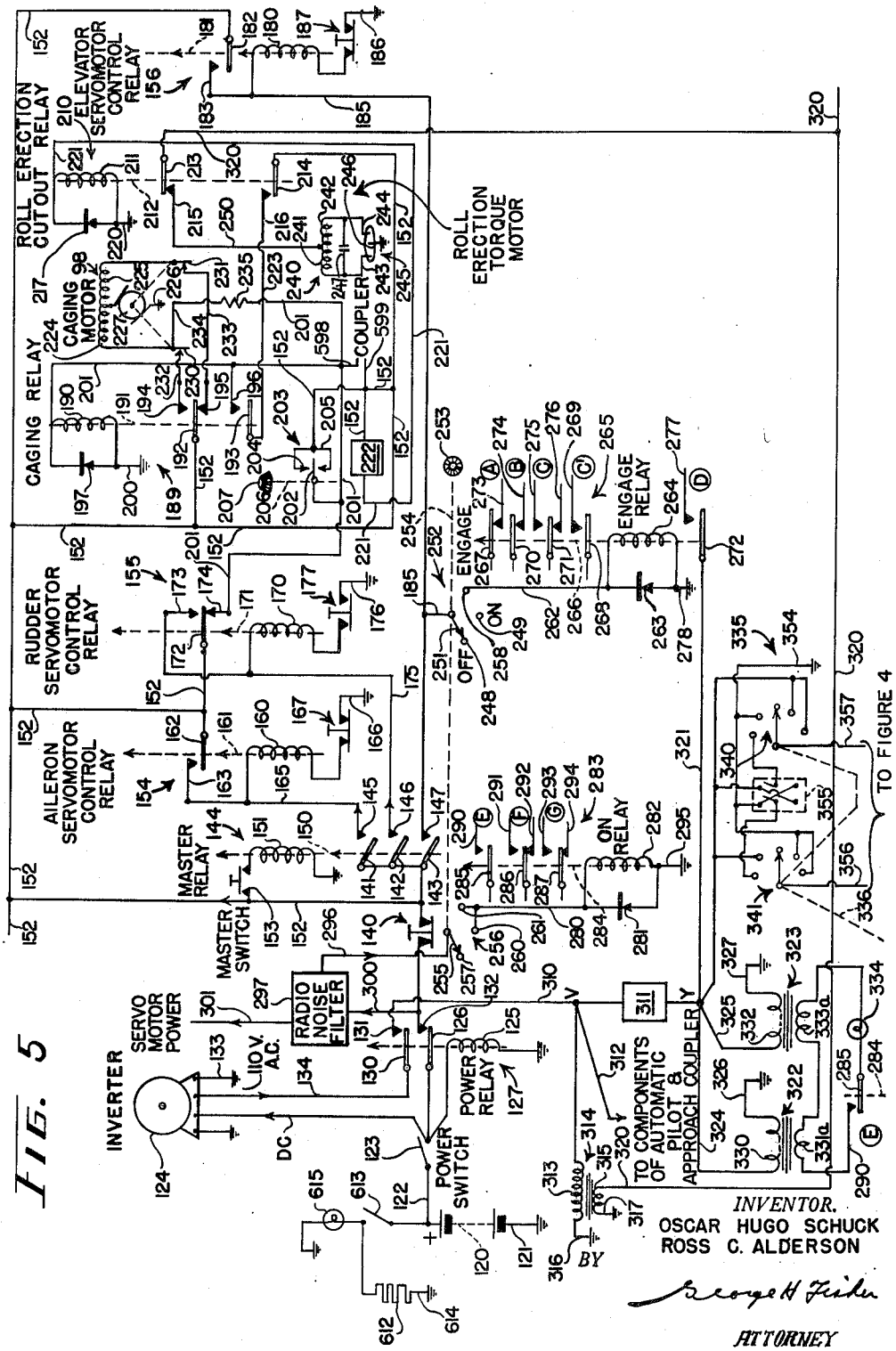

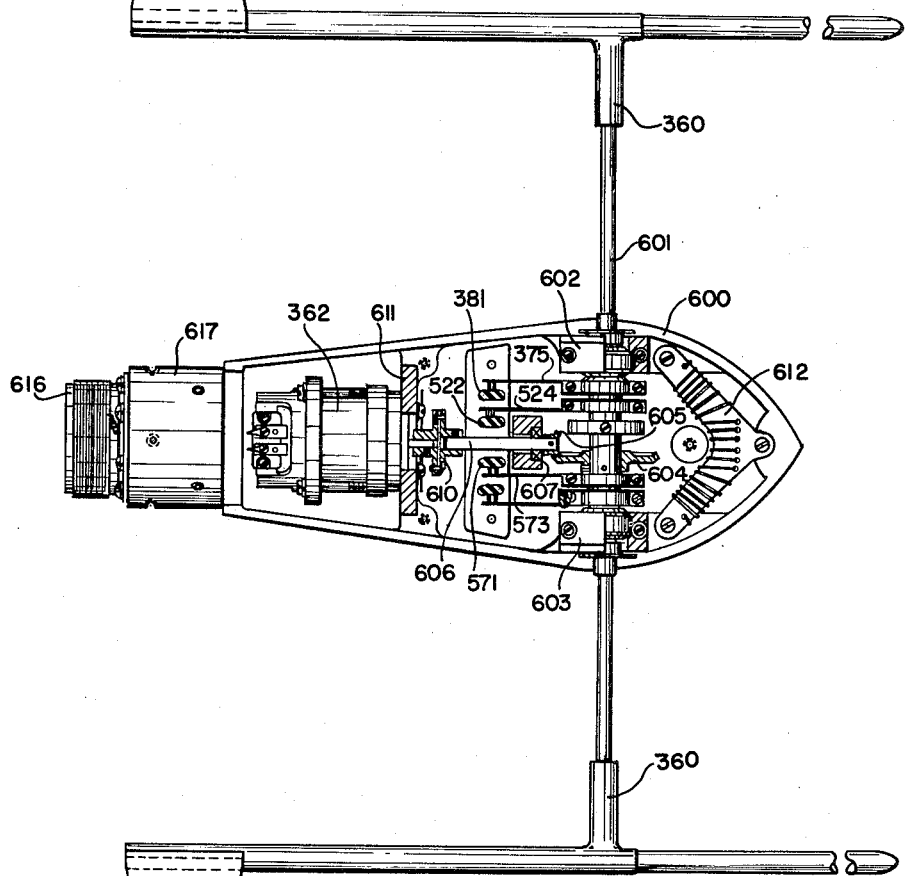
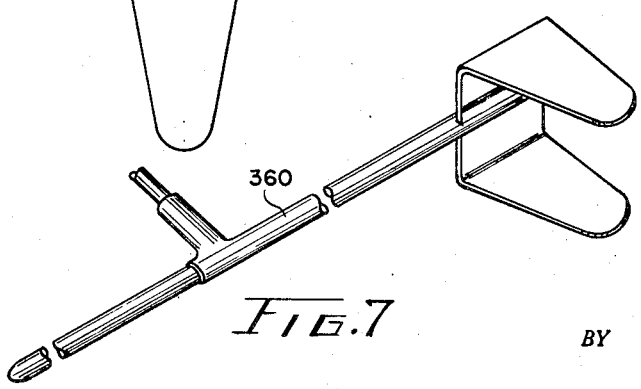

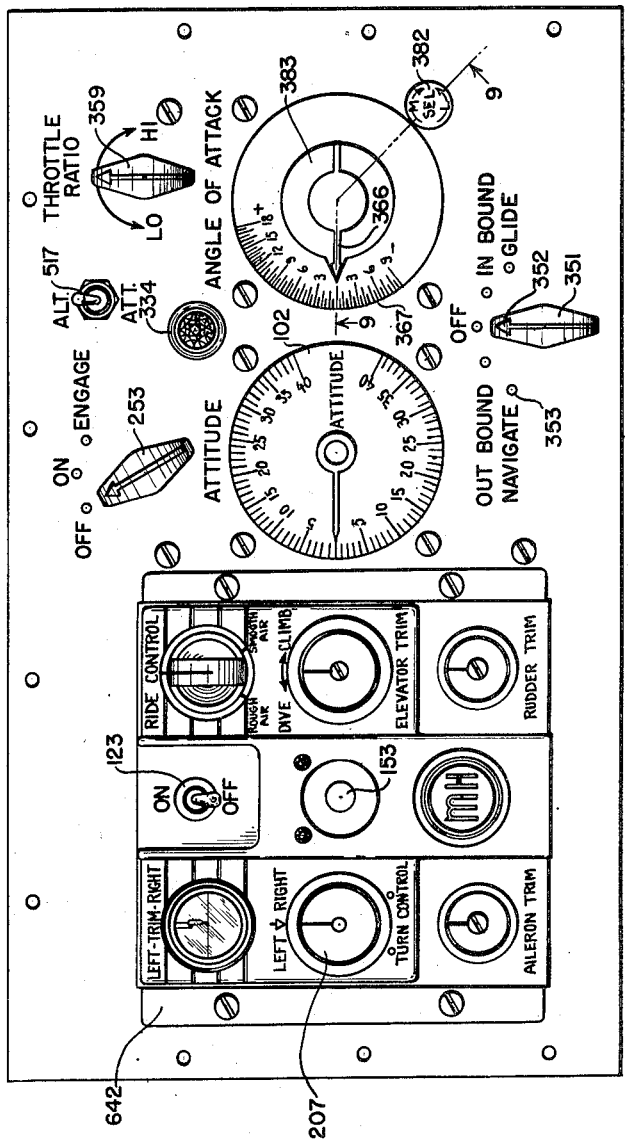

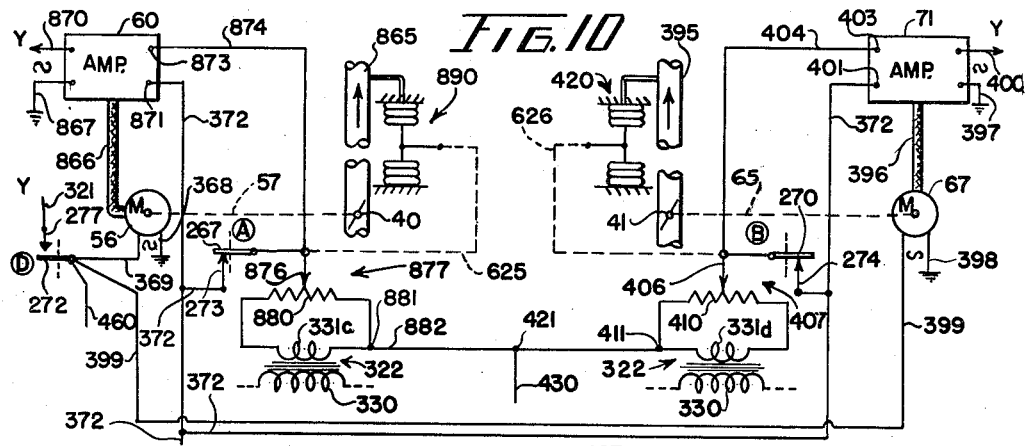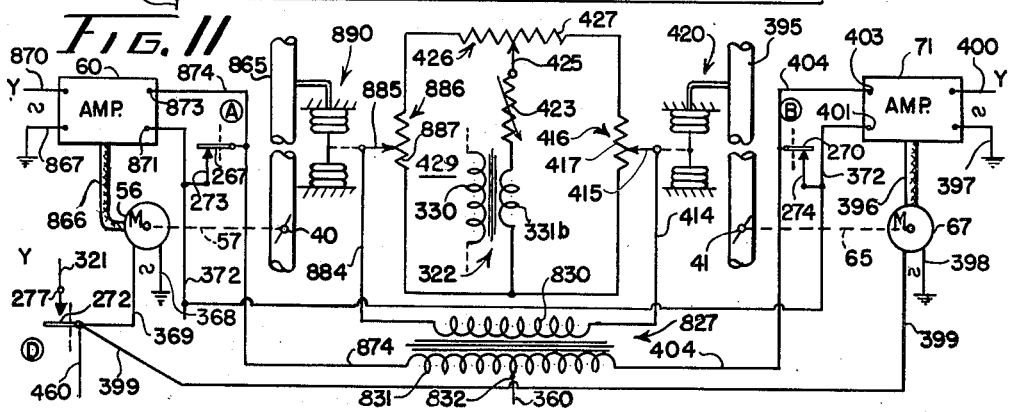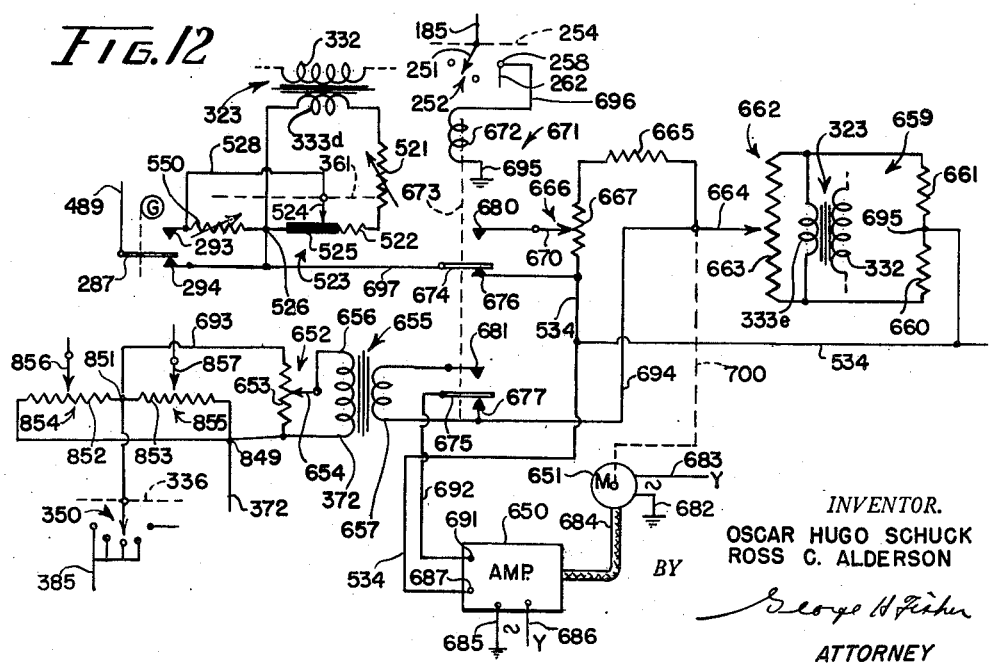
INVENTOR.
OSCAR HUGO SCHUCK
ROSS C. ALDERSON
BY
ATTORNEY United States Patent Office 2,798,682
Patented July 9, 1957

2,798,682
AIRCRAFT CONTROL APPARATUS RESPONSIVE TO ANGLE OF ATTACK

Ross C. Alderson and Oscar Hugo Schuck, Minneapolis, Minn., assignors to Minneapolis-Honeywell Regulator Company, Minneapolis, Minn., a corporation of Delaware Application December 30, 1948, Serial No. 68,238

42 Claims. (Cl. 244—77)

This invention relates to the field of aeronautics and specifically to means for controlling the movement of an aircraft in response to selected conditions. The basic one of these conditions is the attack angle of the craft, and secondary conditions are its deviation from a glide path and its pitch attitude.

In the copending application 68,237 of Waldo H. Kliever, filed of even date herewith, Patent No. 2,677,513, issued May 3, 1954, and assigned to the assignee of the present application, there is disclosed apparatus for controlling a craft so that it maintains a constant attack angle and follows a selected glide path. The present invention is an improvement on this apparatus, embodying features of added safety, convenience, and accuracy. Accordingly, it is an object of the invention to provide improved attack angle control apparatus for aircraft.

Another object of the invention is to provide such apparatus in which both attack angle and altitude are maintained constant by varying the power and allowing the attitude of the craft to change.

Another object of the invention is to provide such apparatus in which both attack angle and attitude are maintained constant by varying the power and allowing the altitude to change.

Another object of the invention is to provide apparatus controlling the throttles of a two engine craft in accordance with attack angle, including means oppositely modifying the two throttle adjustments, in accordance with the difference between the manifold pressures of the engines, so as to reduce the magnitude of the difference.

Another object of the invention is to provide apparatus as just described, in which a first signal varying with attack angle is balanced by a second signal varying with throttle position.

Another object of the invention is to provide apparatus as just described, in which a first signal varying with attack angle is balanced by a second signal varying with manifold pressure.

A further object of the invention is to provide throttle control apparatus in which a signal proportional to error in attack angle is balanceable by the combination of a signal proportional to throttle position and a reset signal determined by the integral of the error in the attack angle.

Another object of the invention is to provide throttle control apparatus as just described in which the arrangement may be altered so as to balance the signal proportional to throttle position by the reset signal only, the latter being continually adjusted as the former changes.

A further object of the invention is to provide throttle control apparatus in which a signal proportional to error in attack angle is balanceable by the combination of a signal proportional to manifold pressure and a reset signal determined by the integral of the error in attack angle.

A further object of the invention is to provide improved apparatus in which an engine throttle can be controlled in accordance with error in attack angle, or with departure of the craft from a glide path, or with both.

A further object of the invention is to provide apparatus in which the movement of the craft is normally controlled so that the attack angle is constant and the flight path is level, but which can be simply altered so that while the attack angle remains constant, the flight path may have a selected downward slope.

Yet another object of the invention is to provide apparatus of the class described in which normal control of the craft is positively overridden whenever the attack angle exceeds a safe value during turning flight, by reducing the signal causing the turn.

Yet another object of the invention is to provide such overriding apparatus in which the throttles and elevators are adjusted to increase power and lower the nose of the craft when stall conditions are imminent.

A still further object of the invention is to provide an improved attack angle sensing device for use in the above apparatus.

A still further object of the invention is to provide an attack angle selecting an indicating instrument for use in the above apparatus.

A still further object of the invention is to provide an improved control panel for the above apparatus, including the improved selecting and indicating instrument.

Another object of the invention is to provide craft control apparatus in which change in the heading of said craft for correcting deviation of the craft from the landing beam may be affected by altering the automatic pilot control circuits, either separately, or in combination with precessing the directional gyroscope.

Various other objects, advantages, and features of novelty which characterize the invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which there are illustrated and described certain preferred embodiments of the invention.

In the drawing,

Figure 1 is a block diagram of a complete installation according to the invention;

Figure 2 is a sketch defining angles referred to in the course of this specification;

Figures 3, 4 and 5 taken together comprise a wiring diagram of a preferred embodiment of the invention;

Figures 6 and 7 show details of an attack angle sensing unit suitable for use in the practice of the invention;

Figure 8 shows a control panel for the apparatus of the invention;

Figure 9 is a cross sectional view of an attack angle selecting and indicating instrument used in the practice of the invention; and Figures 10, 11 and 12 show certain modifications of the invention disclosed completely in Figures 3, 4 and 5.

The apparatus as a whole is shown in block diagram form in Figure 1, and reference should also be made to Figure 2 for definitions of certain terms used herein. Figure 2 is a somewhat schematic showing of an aircraft such as the R4D, which is a two-engine craft having constant speed propellers but no turbo superchargers. The left engine is shown at 10, mounted in a nacelle 11 on the left wing 12, which includes the left aileron 13. The right engine is similarly mounted on the right wing, and in the right aileron 14 there is the customary aileron trim tab 18. The rudder 15 of the craft is provided with a trim tab 16, and is supported by the vertical stabilizer 17. The horizontal stabilizer 20 supports the left elevator 21 and a similar right elevator 22, which are provided with trim tabs 28 and 29 respectively. Members 14, 18, 22, 28 and 29 are not visible in Figure 2, but are shown in Figure 1.

The chord of wing 12 is projected forward as the line 23 in Figure 2. The longitudinal axis of the craft has the direction of the line 24, and the angle between these directions is fixed during the construction of the craft. In flight, the angle between the line 23 and some line 25 representing the direction of the relative wind is the actual attack angle of the wing.

A strut 26 is mounted to project forward from the nose of the craft into undisturbed air, and carries an attack angle sensing device 27. It is most convenient to mount strut 26 parallel to the longitudinal axis of the craft, particularly if the installation is to be made at some time after the craft is originally constructed. The direction of the strut is likewise the most satisfactory zero of direction for the attack angle sensing device, which accordingly measures the angle between lines 24 and 25. The measured angle of the attack however has a constant difference from the actual angle of attack, and may equally well be used in observing the performance of the craft.

It should be emphasized that the direction of line 24 is not necessarily horizontal when the craft is in flight, while for flight at a constant altitude through air without vertical currents the line 25 is horizontal. If the craft is losing altitude the direction of the line 25 is as in Figure 2, while if the craft is gaining altitude the line 25 has an upward rather than a downward inclination measured with respect to the horizontal.

Attack angle is measured from line 24 whether or not it is horizontal, and is positive for the angular relation between lines 24 and 25 shown in Figure 2.

Referring now to Figure 1, the rudder, ailerons and elevators of the craft are shown in the lower right hand corner to be actuated by control surface servomotors 30, 31 and 32 comprising components of an automatic pilot 33. For simplicity of illustration the control stick and rudder pedals by which normal operation of these control surfaces can be performed by a human pilot, have been omitted from the drawing: in practice a mechanical connection 34 between rudder 15 and servomotor 30 includes the rudder pedals, and mechanical connections 35 and 36 between ailerons 13 and 14 and elevators 21 and 22 and their respective servomtors 31 and 32 include the control stick.

In the upper left and right hand corners of the figure are shown the throttles 40 and 41 of the left and right engines of the craft. The throttles are normally controlled by manual levers 42 and 43 respectively. The nature of the power system in an aircraft is such that in the course of an ordinary flight no rapid changes in the need for power take place, so that the only stabilization needed by the throttle levers is some sort of brake to hold them in the positions to which they are set.

The attitude control system of the craft is a different matter. Even if the control stick and rudder are held in particular positions, it does not follow that the attitude of the craft remains that desired. For example, if a craft in normal flight, with its ailerons streamlined, is displaced about its roll axis, as by a gust, and no change in the control stick is made, the craft continues to fly in a rolled attitude for a greater or less length of time depending on the inherent stability of the craft; this results in a change of the heading of the craft as well.

In order to prevent this from happening, automatic pilot 33 includes a directional gyroscope 44 and a vertical gyroscope 45, which normally control operation of servomotors 30, 31, and 32 through other components of the automatic pilot. By this means control surface operation appropriate to any deviation of the craft from a selected attitude about any of its axes is initiated, and the craft is thus caused to continue in flight in a selected direction and in a fixed attitude about its roll and pitch axes, regardless of rough air, changes in trim, and other disturbing factors.

Near the center of Figure 1 there is shown an instrument landing receiver 46, the antenna 47 of which also appears in Figure 2. This receiver acts through an approach coupler 50 to give a plurality of outputs which vary in accordance with the location of the craft relative to an instrument landing path set up in space by radiations from suitable radio transmitters. Structure of this sort is known in the art: one example of means suitable to perform this function is disclosed in copending application #49,442 of Ross C. Alderson and Benjamin Carpenter, filed September 15, 1948, and assigned to the assignee of the present invention.

Near the lower left hand corner of Figure 1 there are shown the major components making up attack angle sensing device 27. In addition to a member 51 giving response directly to attack angle, the device includes a bank stall component 52 and a straight stall component 53, and supplies a further mechanical output at 58.

The general functions of the apparatus can now be indicated. Normal supervision of the throttles rests in the throttle levers, and normal supervision of the aerodynamic control surfaces rests in the gyroscopes. This normal control is subject to overriding, in accordance with output from responsive member 51, so that the craft continues in flight at a constant selected attack angle. If the attitude of the craft is stabilized, there is only one attack angle for which flight at constant altitude results. If any other attack angle is selected, the craft takes on a positive or negative rate of climb. Alternatively the attitude of the craft may be changed with change in attack angle to maintain flight at a constant altitude.

The normal control is also subject to overriding in accordance with the output of coupler 50, in the same general way as set forth in the second mentioned copending application, and also in accordance with both these outputs acting simultaneously. To accomplish these functions further components are comprised in the system, as follows.

Throttle 40 is actuated from lever 42 through a mechanical connection 54 including an overrunning clutch 55. A throttle motor 56 provides a mechanical input 57 to clutch 55, which is so constructed that either motor 56 or lever 42 can operate throttle 40, while lever 42 can at any time operate throttle 40 in either direction regardless of whether motor 56 is operating in the same or the opposite direction, or is standing still.

Motor 56 is energized from a motor control amplifier 60 having two signal inputs. The first input is that from a throttle position responsive device 61, driven simultaneously with throttle 40 by mechanical connection 54. The second input 59 is derived from a manifold pressure equalizer 63.

Equalizer 63 also energizes a second engine control system like that just described. Throttle 41 and a throttle position responsive device 64 are driven, through a mechanical connection 65 including an overrunning clutch 66, from lever 43, and also from a motor 67, which is energized from a motor control amplifier 71 having an input from device 64 and an input 68 from equalizer 63.

Three inputs are supplied to equalizer 63. The principal input is that supplied at 72, which varies as will be explained. This input is modified by two further inputs 73 and 74 to give two modified outputs which are supplied as inputs 59 and 68 to amplifiers 60 and 71. Input 73 varies in accordance with the manifold pressure in the left engine, while input 74 varies in accordance with the manifold pressure in the right engine, and in equalizer 63 no modification of the signal supplied at 72 takes place for the special case when inputs 73 and 74 are equal. For all other cases the modified outputs are different from the input, that for the engine having the greater manifold pressure being reduced and that for the other engine being increased as compared to input 72. By this means the effects of any differences between the engines, which normally result in different power outputs from the same throttle settings, may be minimized.

Attack angle sensing device 27 is shown in detail in Figures 6 and 7, and will be discussed more fully below The device includes the transmitter of a telemetric system 75, having a receiver which drives an indicator 76 to give a convenient indication of the measured attack angle. Indicator 76 in practice is combined with an attack angle selector 77 to comprise the instrument shown in Figures 8 and 9. Selector 77 supplies an output 81 to a pitch component 82 of the automatic pilot.

Outputs from responsive member 27 and selector 77 are combined in an angle comparison unit 80, which provides a first output 83 which is supplied to a function selector 84, and a second output 85 which is supplied to function selector 84 through a glide path angle preset device 86 and approach coupler 50. The output 87 from function selector 84 may be either input 83 or input 85, according to operation of the selector.

Output 87 is supplied to a throttle reset amplifier 90 through a first ratio control 91. Amplifier 90 energizes a throttle reset motor 92 which varies the output of a throttle reset responsive device 93. As long as output 87 is of a first sense, motor 92 operates to increase the output of device 93, and as long as output 87 is of the opposite sense, motor 92 operates to decrease the output of device 93: when output 87 is zero, motor 92 does not operate, and the output of device 93 remains at whatever value it then has. Motor 92 also drives a velocity generator 94 which provides a second input to amplifier 90, serving to regulate the speed of motor 92 so that it varies in accordance with the magnitude of the signal 87, as is well known in the art.

Input 72 comprises the output from device 93 combined with a portion of output 87 determined by the adjustment of a second ratio control 95. The magnitude of input 72 therefore depends on the output of selector 84 and also on the past values of that output as they determine the magnitude of the output of reset responsive device 93. Members 90, 92 and 93 are in effect an integrating system for correcting the present value of the difference between selected and measured attack angle by a factor determined by the integral of all its previous values, when the apparatus is being used simply as a constant attack angle arrangement for normal flight.

Switching means identified in Figure 1 as a reset synchronizer 98 are provided to substitute an input from manifold pressure equalizer 63 for the inputs to reset amplifier 90 from velocity generator 94 and ratio control 91, and to disconnect ratio control 95 from reset responsive device 93. This switching arrangement is discussed in detail in connection with Figure 3.

Directional gyroscope 44 of automatic pilot 33 is shown as being provided with a precessing motor 96 for changing the direction of the stabilized axis, and as supplying an input to a turn component 97 of the automatic pilot. Inputs from the approach coupler 50 are supplied to precessing motor 96 and to turn component 97, under control of function selector 84 as indicated at 100. Since it is necessary, in order that turns be properly coordinated, that not only rudder but aileron operation take place, an input is also supplied to turn component 97 from the vertical gyroscope 45. Turn component 97 controls the energization of amplifiers suggested at 101 which regulate the operation of rudder servomotor 30 and aileron servomotor 31. A further interconnection between turn component 97 and amplifier 101 is supplied through bank stall component 52.

Vertical gyroscope 45 supplies an input to pitch component 82 of automatic pilot 33, which is also provided with inputs from approach coupler 50 and straight stall component 53 of attack angle responsive device 27. Pitch component 82 controls the energization of an amplifier also suggested at 101 which regulates the operation of elevator servomotor 32. Vertical gyroscope 45 also supplies a signal for a remote attitude indicator 102.

Figures 3, 4 and 5 taken together comprise a detailed wiring diagram of the apparatus as a whole. Automatic pilots per se are well known in the art, and include a number of refinements which are without significance as far as an attack angle control system is concerned. The drawing therefore shows only such details of the automatic pilot as are necessary to a complete understanding of the system as a whole, it being obvious that the addition of further refinements as desired is well within the abilities of those skilled in the art. Although a clean division cannot of course be made, Figure 5 generally discloses the power supply and automatic pilot control components of the system, Figure 4 particularly the components related to the approach coupler and the stall prevention devices, and Figure 3 the structure related particularly to attack angle sensing and control.

The primary source of electrical energy in an aircraft is an engine charged battery shown at 120 in Figure 5. The negative terminal of the battery is grounded at 121, and the positive terminal is connected by a conductor 122 to a power switch 123, which supplies electrical energy to an inverter 124, and to the winding 125 and one movable contact 126 of a power relay 127 having a further movable contact 130 and a pair of fixed contacts 131 and 132. The alternating voltage output of inverter 124 appears between ground connection 133 and a conductor 134, by which it is impressed on movable contact 130 of relay 127. As long as power switch 123 is closed, relay 125 is energized, displacing movable contacts 126 and 130 upwardly so that they engage fixed contacts 132 and 131 respectively. By this means the supply of alternating and direct voltage to the entire system may be controlled.

D. C. power from fixed contact 132 is supplied through a normally closed master disengage button 140 to the movable contacts 141, 142 and 143 of a Master relay 144 having fixed contacts 145, 146 and 147 operated by an armature 150, and a winding 151 energized from switch 140 through a conductor 152 and a normally open momentary contact master switch 153.

Master relay 144 controls the operation of an Aileron relay 154, a Rudder relay 155, and an Elevator relay 156. Aileron relay 154 is shown to comprise a winding 160 energization of which actuates an armature 161 to engage a first movable contact 162 with a fixed contact 163: armature 161 is provided with further contacts, not shown, for performing detailed control functions in determining the operation of the aileron servomotor. Winding 160 is energized from fixed contact 145 through conductor 165 and a ground connection 166 which includes a normally closed momentarily operated disengage switch 167. Fixed contact 163 is connected to winding 160, and movable contact 162 is connected to conductor 152, to provide a holding circuit for relay 154.

Rudder relay 155 is shown to comprise a winding 170 which actuates an armature 171 to disengage a movable contact 172 from a first fixed contact 174, which it normally engages in the off condition of the relay, and to engage it with a second fixed contact 173: armature 171 is provided with further contacts, not shown, for controlling the operation of the rudder servomotor. Winding 170 is energized from fixed contact 146 of master relay 144 through a conductor 175 and a ground connection 176 which includes a normally closed momentarily operated disengage switch 177.

Fixed contact 173 is connected to winding 170, and movable contact 172 is connected to conductor 152, to provide a holding circuit for relay 170.

Elevator relay 156 is shown to comprise a winding 180 which actuates an armature 181 to engage a movable contact 182 with a fixed contact 183: armature 181 is provided with further contacts for controlling the operation of the elevator servomotor. Winding 180 is energized from fixed contact 147 through conductor 185 and a ground connection 186 which includes a normally closed momentarily operated disengage switch 187. Fixed contact 183 is connected to winding 180, and movable contact 182 is connected to conductor 152, to provide a holding circuit for the relay.

In Figure 5 there is also shown a Caging relay 189 for the directional gyroscope. This relay comprises a winding 190 which causes an armature 191 to actuate movable contacts 192 and 193 with respect to fixed contacts 194, 195 and 196. The normal condition of the relay is that in which movable contact 192 engages fixed contact 195, and in which movable contact 193 is disengaged from fixed contact 196. A rectifier 197 is connected across winding 190 to absorb voltage surges.

One end of winding 190 is grounded at 200. The other end is connected by a conductor 201 to fixed contact 196 of relay 189, to fixed contact 174 of relay 155, and to the movable contact 202 of a switch 203 having fixed contacts 204 and 205 and actuable out of a normal position, in which it does not contact either fixed contact, by a mechanical connection 206 to a turn control knob 207. Fixed contacts 204 and 205 of switch 203 are connected to conductor 152, as is movable contact 192 of relay 189.

A roll erection Cutout relay 210 is also shown in Figure 5. This relay comprises a winding 211 which actuates an armature 212 to disengage a movable contact 213 from a fixed contact 215, and to bring a movable contact 214 into engagement with a fixed contact 216. A rectifier 217 is connected across winding 211 to absorb voltage surges. One end of winding 211 is grounded as at 220. The other end of the winding is connected through a conductor 221 and a normally open control device 222 to conductor 152. Movable contact 214 is connected to conductor 152. Fixed contact 216 is connected to movable contact 193 of relay 189 by a conductor 223.

Caging motor 98 of directional gyroscope 44 is shown in Figure 5 to comprise a pair of directional field windings 224 and 225 having a common terminal grounded at 226 through the rotor 227 of the motor. The free terminals of windings 224 and 225 are connected through limit switches 230 and 231 and conductors 232 and 233 to fixed terminals 194 and 195 of Caging relay 189. In addition to this, the free terminal of winding 224 is connected through conductor 234 and a resistor 235 to conductor 201.

Of the two erection motors in vertical gyroscope 45, that controlling the roll erection of the gyroscope, is shown at 240 in Figure 5 to comprise a pair of windings 241 and 242 having a common terminal. The free terminals of these windings are connected to end electrodes 243 and 244 of a single pole double throw mercury switch 245 carried by the vertical gyroscope for tilting with tilt of the craft about its pitch axis, and having a central grounded connection 246. A capacitor 247 is connected across the free terminals of windings 241 and 242, and the common terminal is connected to fixed contact 215 of relay 210 by conductor 250.

Also connected to fixed contact 147 of Master relay 144, by conductor 185, is the movable contact 251 of a single pole triple throw switch 252 having a plurality of fixed contacts 248, 249 and 258, only the latter of which performs an operative function. Switch 252 is actuated by a manual knob 252 through a mechanical connection 254, which is continued to operate the movable contact 255 of a second switch 256 having a fixed contact 257 to which no connection is made, and a pair of further fixed contacts 260 and 261. Knob 253 is movable from an "Off" position in which movable contacts 251 and 255 engage fixed contacts 248 and 257, through an "On" position in which movable contacts 251 and 255 engage fixed contacts 249 and 260, to an "Engage" position in which movable contacts 251 and 255 engage fixed contacts 258 and 261, all respectively.

Fixed contact 258 is connected by a conductor 262 to one end of the winding 264 of an Engage relay 265. The other end of winding 264 is grounded at 278, and a rectifier 263 is connected across the winding to absorb voltage surges. Relay 265 has an armature 266 for displacing a plurality of movable contacts 267, 170, 271, 268, and 272 with respect to their several fixed contacts 273, 274, 275 and 276, 269, and 277. In the normal or unenergized condition of relay 265, movable contact 267 engages fixed contact 273, movable contact 270 engages fixed contact 274, and movable contact 271 engages fixed contact 276: no contact is made between movable contact 271 and fixed contact 275, movable contact 268 and fixed contact 269, or movable contact 272 and fixed contact 277.

Fixed contacts 260 and 261 of switch 256 are connected by a conductor 280 to one end of the winding 282 of an On relay 283. The other end of winding 282 is grounded at 295, and a rectifier 281 is connected across the winding to absorb voltage surges. Relay 283 has an armature 284 which displaces a plurality of movable contacts 285, 286, and 287 with respect to fixed contacts 290, 291 and 292, and 293 and 294.

In the normal condition of On relay 283 electrical connection is made between movable contact 286 and fixed contact 292 and between movable contact 287 and fixed contact 294: no electrical connection is made between movable contact 285 and fixed contact 290, between movable contact 286 and fixed contact 291, or between movable contact 287 and fixed contact 293.

For simplicity in illustration, the various movable and fixed contacts of relays 283 and 265 have been identified as separate switches, and are located in Figures 3, 4, and 5 in such positions as will make the drawing most easy to read. Movable contact 267 and fixed contact 273 combine to form switch A, which appears in the upper left hand corner of Figure 3. Movable contact 270 and fixed contact 274 combine to form switch B, which appears in the upper right hand portion of Figure 3. Movable contact 271 and fixed contacts 275 and 276 combine to form switch C, and movable contact 268 and fixed contact 269 combine to form switch C', both of which appear in the center of Figure 3. Movable contact 272 and fixed contact 277 combine to form switch D, which appears in the center left hand portion of Figure 3. Movable contact 285 and fixed contact 290 combine to form switch E which is shown in the lower left hand portion of Figure 5. Movable contact 286 and fixed contacts 291 and 292 combine to form switch F, which appears in the lower right hand portion of Figure 4. Movable contact 287 and fixed contacts 293 and 294 combine to form switch G, which appears in the lower central portion of Figure 5.

A discussion of the D. C. portion of Figure 5 may be concluded by pointing out that conductor 152 in the actual structure of the automatic pilot is continued to energize other components which are without significance as far as the present invention is concerned, and that movable contact 255 of switch 256 is energized through a conductor 296, a radio noise filter 297, and a conductor 300 from fixed contact 132 of power relay 127. Radio noise filter 297 also supplies power as at 301 for the servomotors of the automatic pilot.

The A. C. portion of Figure 5 is energized from fixed contact 131 of power relay 127 through a conductor 310: the energy is supplied to a first distribution terminal V, and thence through a normally closed control device 311 to a second distribution terminal Y. From terminal V alternating voltage is supplied as indicated at 312 to various components of the automatic pilot and the approach coupler whose detailed operation is of no concern in connection with the present invention, and also to the primary winding 313 of a transformer 314 having a secondary winding 315, the primary circuit being completed through ground connections 316 and 133. One end of secondary winding 315 is grounded at 317. The other end of secondary winding 315 is connected by a conductor 320 to movable contact 213 of roll erection cutout relay 210, and is also continued to supply other portions of the complete apparatus.

Terminal Y energizes the movable contact 272 of Engage relay 265 through a conductor 321. A pair of transformers 322 and 323 are also energized from terminal Y through conductors 324 and 325 and ground connections 326 and 327 respectively.

Transformer 322 is provided with a primary winding 330, and a plurality of secondary windings which are identified by the reference numeral 331 together with a letter subscript. Secondary winding 331a appears in Figure 5. Secondary winding 331b, 331c, 331d, and 331e, appear in the upper portion of Figure 3, and secondary winding 331f appears in the lower left hand portion of that figure. For purposes of clarity of illustration each secondary winding is shown associated with a portion of primary winding 330, which therefore appears broken away both in Figure 3 and in Figure 5.

In an exactly similar fashion transformer 323 is shown to comprise a primary winding 332 which is broken away, and a plurality of secondary windings, of which winding 333a appears in Figure 5, windings 333b and 333c appear in the lower portion of Figure 3, and winding 333d appears in the lower right hand portion of Figure 4.

Secondary windings 331a and 333a are connected in a series circuit with a signal lamp 334 and switch E of On relay 283. Lamp 334 is selected so that the operating voltage at which it shines with full brilliance is equal to the sum of the outputs of secondary windings 331a and 333a.

Also energized from terminal Y is a phase controller 335, of which portions are included in function selector 84. This device is in reality a multiple section switching device comprising a plurality of single pole five position switches operated unitarily by a single mechanical connection 336. These switches are identified by the reference numerals 340 to 350 inclusive. Of these, switches 340 and 341 appear at the bottom of Figure 5, switches 342 and 343 appear at the top of Figure 4, switches 344 and 345 appear in the upper center portion of Figure 4, switches 346 and 347 appear in the lower left hand portion of Figure 4, and switches 348, 349 and 350 appear in the lower central portion of Figure 3. Mechanical connection 336 is shown as joining all of the switches, and as carrying a manual knob 351 having an index 352 movable with respect to a scale 353. Accordingly knob 351 is shown to have five positions, a first or "Navigate" position, a second or "Outbound" position, a third or "Off" position, a fourth or "Inbound" position, and a fifth or "Glide" position. So far as these switches and their functions are related purely to approach coupler 50, a complete discussion is to be found in the copending application of Alderson and Carpenter referred to previously. This description will therefore be repeated here only as it is necessary to an understanding of the present invention.

For convenience in further discussion, the several contacts of each switch will be identified by the position of knob 351 in which the movable contact of the switch engages the particular fixed contact in question. Thus the central contact in each switch is the "Off" contact, the most counterclockwise contact is the "Navigate" contact, the most clockwise contact is the "Clock" contact, the contact between the "Glide" contact and the "Off" contact is the "Inbound" contact, and the contact between the "Off" contact and the "Navigate" contact is the "Outbound" contact.

With these definitions in mind, it will be evident that the "Outbound" contact of switch 341, and the "Inbound" and "Glide" contacts of switch 340 are energized directly from terminal Y. Similarly the "Outbound" contact of switch 340 and the "Inbound" and "Glide" contacts of switch 341 are connected to ground connection 354. The "Navigate" contacts of switches 340 and 341 are connected to the movable contacts of a reversing switch 355 which is also energized from terminal Y and ground connection 354. The output from phase controller 335 appears between a pair of conductors 356 and 357 connected to the movable contacts of switches 341 and 340 respectively: these conductors are connected to coupler 50, as shown in Figure 4, so that the sense of its energization may be reversed as is necessary under certain conditions.

The power and control circuits of Figure 5 having been described, attention should now be directed to Figures 3 and 4. In the lower left corner of Figure 3 there is shown an attack angle sensing vane 360, which actuates a mechanical connection 361 extending across the bottom of Figure 3 and also across the bottom of Figure 4, to operate various devices which will presently be described. The first of these devices is a telemetric transmitter 362, shown in Figure 3 as energized from distribution terminal V, and as connected by a suitable multiconductor cable 363 with a telemetric receiver 364; transmitters 362 and 364 together make up telemetric system 75 of Figure 1. Receiver 364 is also energized from distribution terminal V, and operates a mechanical connection 365 to position an index 366 with respect to a scale 367.

Mechanical connection 361 is shown to alter the condition of an attack angle bridge 370, which functions as angle comparison unit 80 of Figure 1. Bridge 370 is shown to be energized at input terminals 371 and 373 from secondary winding 331f of transformer 322. The output terminals of bridge 370 are the sliders 374 and 375 of a pair of voltage dividers 376 and 377 having windings 380 and 381 all respectively. A voltage dropping variable resistor 379 is included in the upper half of the bridge to give a centering adjustment. Slider 375 is connected to a signal ground conductor 372, and is arranged for actuation by mechanical output 361 from attack angle sensing vane 360, to comprise attack angle repose unit 51 of Figure 1. Slider 374 is connected for actuation by a mechanical connection 378 to a selector knob 382, having an index 383 movable with respect to a scale 384, to comprise attack angle selector 77 of Figure 1. Slider 374 is connected by a conductor 385 to the "Navigate," "Outbound," "Off," and "Inbound" contacts of switch 350. The movable contact of switch 350 is connected to the common terminal 851 between the windings 852 and 853 of a pair of voltage dividers 854 and 855 having sliders 856 and 857 respectively. The other ends of windings 852 and 853 are connected to signal ground conductor 372 at a terminal 849.

Voltage dividers 854 and 855 comprise ratio controls 95 and 91 respectively of Figure 1. Slider 357 of voltage divider 355 is connected to fixed contact 275 of switch C by conductor 360, and is actuated by a mechanical connection 858 to a manual knob 359. For any given setting of slider 857 on winding 853, the voltage appearing on fixed contact 275 of switch C in any position of knob 351 except the Glide position is determined by the unbalance of bridge 370.

Turning now to the upper left-hand corner of Figure 3, the induction system to the left engine of the craft is shown to comprise an air scoop 861, throttle 40, a carburetor 863, an engine driven blower 864, and an intake manifold 865. Throttle 40 is shown as being actuated by motor 56 through mechanical connection 57: for simplicity of illustration clutch 55 and manual lever 42 have been omitted from Figure 3. Motor 56 is energized from amplifier 60 through a suitable cable 866 and power to the amplifier is shown as being derived through a ground connection 867 and a conductor 870 leading to distribution terminal Y. One input terminal 871 of amplifier 60 is connected to signal ground conductor 372. The other input terminal 873 of the amplifier is connected by a conductor 874 to movable contact 267 of switch A: fixed contact 273 of the switch is grounded to conductor 372.

Movable contact 267 of switch A is also connected, by a conductor 875, to the slider 876 of a voltage divider 877 having a winding 880: voltage divider 877 comprises the left throttle position response 61 of Figure 1, and is connected in a circuit including a variable resistor 878 and secondary winding 331c of transformer 322. An input terminal 881 in this circuit is connected by a conductor 882 to a resistor 883, and by a second conductor 884 to the slider 885 of a voltage divider 886 having a winding 887. Slider 885 is moved with respect to winding 887 by mechanical connection to a manifold pressure responsive device 890, which may be of any conventional construction.

The structure just described is symmetrical with like structure shown in the upper right-hand corner of Figure 3 and associated with the right engine of the craft. The induction system for this engine is shown to comprise an air scoop 391, throttle 41, a carburetor 393, an engine driven blower 394, and an intake manifold 395. Throttle 41 is shown as actuated by motor 67 through mechanical connection 65: for simplicity of illustration clutch 66 and manual lever 43 have been omitted from the figure. Motor 67 is energized through a suitable cable 396 from amplifier 71, which is supplied with power from a ground connection 397 and a connection 400 to distribution terminal Y. Input terminal 401 of amplifier 71 is grounded to conductor 372. Input terminal 403 of the amplifier is connected by a conductor 404 to movable contact 270 of switch B: fixed contact 274 of this switch is grounded.

Movable contact 270 is also connected by a conductor 405 to the slider 406 of a voltage divider 407 having a winding 410, which comprises throttle position response unit 64 of Figure 1. Slider 406 is actuated together with throttle 41 by mechanical connection 65. Winding 410 is connected in a series circuit with a variable resistor 408 and secondary winding 331d of transformer 322. The circuit has an input terminal 411 connected by a conductor 412 with a resistor 413, and by a second conductor 414 with the slider 415 of a variable resistor 416 having a winding 417. Slider 415 is moved along winding 417 by mechanical connection to a manifold pressure responsive device 420 of any suitable type.

Each of motors 56 and 67 is preferably provided with some form of antihunt device for reducing overshooting of sliders 876 and 406, to give the systems quick balancing properties and increase their dependability. Velocity generators driven by the motors and feeding back inversely into amplifiers 60 and 71 comprise a preferred method of supplying this antihunt characteristic to the operation of the systems, as is known to those skilled in the art.

Resistors 883 and 413 have a common terminal 421. Voltage dividers 886 and 416 comprise portions of a bridge circuit 422, of which sliders 885 and 415 comprise the output terminals. Bridge 422 is energized from the secondary winding 331b of transformer 322, through a voltage adjusting variable resistor 423. One of the input terminals to bridge 422 is shown at 424, the other comprises the slider 425 of a voltage divider 426 having a winding 427, which functions to provide a centering adjustment for the bridge.

Terminal 421 common to resistors 883 and 413 is connected by a conductor 430 to one terminal 431 of a circuit energized from secondary winding 331e of transformer 322, and including a pair of centering variable resistors 432 and 433 and the winding 434 of a voltage divider 435 having a slider 436 which comprises the other terminal of the circuit. Voltage divider 435 comprises throttle reset response device 93 of Figure 1. Slider 436 is connected to movable contact 271 of switch C by a conductor 437, and is moved with respect to winding 434 by a mechanical connection 440 to throttle reset motor 92. Connection 440 includes reduction gearing 429.

The line phase of motor 56 is shown as energized through ground connection 368 and a conductor 369 connected to movable contact 272 of switch D. The line phase of motor 67 is shown as energized through a ground connection 398 and a conductor 399 connected to movable contact 272 of switch D.

The line phase of motor 92 is shown as energized from ground connection 438 and a conductor 439 connected to distribution terminal Y. Operation of this motor is controlled by an amplifier 90 through a suitable cable 441. Amplifier 90 is shown as energized through a ground connection 442 and a conductor 448 leading to distribution terminal Y.

One of the input terminals 443 of amplifier 90 is grounded to conductor 372. The other input terminal 445 of the amplifier is connected by a conductor 446 to the fixed contact 276 of switch C, and to the slider 447 of a voltage divider 450 having a winding 451. One terminal of winding 451 is connected by conductor 454 to fixed contact 269 of switch C', of which the movable contact 268 is connected to slider 856 of voltage divider 854 by a conductor 444. Switches C and C' comprise reset synchronizer 98 of Figure 1. Winding 451 is energized through conductors 454 and 455 from the output of velocity generator 94, which is mounted on the same shaft as motor 92 and driven at the same speed. The input to generator 94 is applied at ground connection 457 and a conductor 460 leading to movable contact 272 of switch D.

The components of the normal throttle control system included in Figure 3 have been described, but certain other components appear in this figure which are used only in the glide position of function selector 84, to modify the selected attack angle. These components include a glide angle preset circuit 459 shown near the bottom of the figure, having a terminal 461 connected to conductor 385. This circuit is energized from secondary winding 333b of transformer 323, and includes a voltage adjusting variable resistor 462 and the winding 463 of a voltage divider 464 having a slider 465. Slider 465 and the "Glide" contact of switch 350 are connected by conductors 466 and 467 respectively to the throttle output of approach coupler 50, which will be discussed in connection with Figure 4.

Just as bridge 370 comprises a portion of the throttle control system shown in Figure 3, a second bridge 469 comprises a portion of the elevator control system. The bridge is energized at input terminals 470 and 471, through dropping resistors 472 and 473, from secondary winding 333c of transformer 323. Across input terminals 470 and 471 is connected a series circuit including a fixed resistor 474 and a variable resistor 475, which varies the bridge output voltage by changing the current through, and hence the voltage drop in, resistors 472 and 473. The output terminals of the bridge comprise the slider 476 of a voltage divider 477 having a winding 480, and the slider 481 of a voltage divider 482 having a winding 483. The portions of winding 480 on either side of slider 476 comprise the two upper arms of bridge 471, and the portions of winding 483 on either side of slider 481 together with a pair of fixed resistors 484 and 485 comprise the lower arms of the bridge. Slider 476 is actuated simultaneously with actuation of slider 374 of bridge 370 through mechanical connection 381 driven by manual knob 382. The output from bridge 469 appears between conductors 486 and 487 connected to sliders 476 and 481 respectively.

Reference should now be made to Figure 4, in the lower left corner of which is shown the instrument landing system 46 with its antenna 47, and the approach coupler 50' which is energized therefrom. Coupler 50' is provided with power through ground connection 490 and a conductor 491 connected to distribution terminal V. The coupling unit is shown as energized a pair of motors 492 and 492' through suitable cables 493 and 493'; these motors, like motors 56 and 71, are preferably provided with suitable antihunt means. Arranged above coupler 50' are a number of further components of the approach coupler, of which that indicated at 494 relates to the elevator control of the craft, that indicated at 495 relates to the throttle control of the aircraft, that indicated at 496 relates to control of the turn component of the automatic pilot, and that indicated at 497 relates to the control of the precessing motor of the directional gyroscope. In the showing of Figure 1, motors 492 and 492' and components 494, 495, 496 and 497 are all comprehended in the general symbol 50 for the approach coupler.

Components 494, 495, 496 and 497 are supplied with power from phase controller 335 through conductors 356 and 357, which energize the primary winding 501 of a transformer 500 having a plurality of secondary windings 502a, 502b, 502c, and 502d. For the sake of convenience in illustration, the secondary windings are located in various positions on Figure 4, and in connection with each secondary winding is shown a fragment of primary winding 501 which is therefore in each case shown as broken away.

In elevator component 494 secondary winding 502d of transformer 500 is shown as energizing, through a dropping resistor 508, the winding 506 of a voltage divider 507 having a slider 510 and a center tap 511. Slider 510 is moved with relation to winding 506 by a mechanical connection 512 to motor 492. Connected between slider 510 and center tap 511 is the winding 513 of a voltage divider 514 having a slider 515. Slider 515 of voltage divider 514 is connected to the "Glide" contact in switch 347, and the remaining contacts of the switch are connected by a conductor 489 to center tap 511, and to the movable contact 516 of a single pole single throw switch 517 having fixed contacts 518 and 519. Conductor 486 from bridge 469 of Figure 3 is connected to the movable contact 287 of switch G as seen in Figure 4 and to fixed contact 518 of switch 517. Conductor 487 from bridge 469 is connected to fixed contact 519 of switch 517.

Switch G forms a portion of a straight stall prevention circuit indicated by the general reference numeral 520. This circuit is energized from the secondary winding 333d of transformer 323, and includes a voltage adjusting variable resistor 521 and the winding 522 of a voltage divider 523 having a slider 524 actuated by mechanical connection 361 to vane 360, to comprise straight stall component 53 of Figure 1. A considerable portion of the winding 522 of voltage divider 523 is metalized as indicated at 525. Connected between slider 524 and a terminal 526 at the metalized end of winding 522 is a characterizing variable resistor 530. Terminal 526 is connected to a control ground conductor 534 and to fixed contact 294 of switch G. The other end of resistor 530, and slider 524 of voltage divider 523, are connected to fixed terminal 293 of switch G by conductor 528.

The output of elevator component 494 appears between the movable contact of switch 347 and control ground conductor 534, and is supplied to the elevator circuit of the automatic pilot through a conductor 533 and control ground conductor 534.

In throttle control component 495, secondary winding 502c of transformer 500 energizes the winding 535 of a voltage divider 536 having a slider 537 and a center tap 541, through a dropping resistor 540. Connected between center tap 541 and slider 537 is the winding 542 of a second voltage divider 543 having a slider 544 and an end terminal 545. Slider 544 is connected to the "Glide" contact of switch 346. Slider 537 is actuated by mechanical connection 512 from motor 492. This connection is continued, since its function is needed elsewhere in the coupler. Terminal 545 is connected to all the other fixed contacts of switch 346. Conductors 467 and 466 from circuit 459 of Figure 3 are connected to the movable contact of switch 346 and to terminal 545.

Turn control component 496 is energized from secondary winding 502b of transformer 500, which is shown as connected through a dropping resistor 546 to the winding 547 of a voltage divider 550 having a slider 551 and a center tap 552. Connected in series between slider 551 and center tap 552 are the windings 553 and 554 of a pair of voltage dividers 555 and 556 having sliders 557 and 560, all respectively. Slider 551 is actuated by mechanical connection 512' from motor 492'.

Center tap 552 is connected by conductor 561 to control ground conductor 534, and the "Off" contact of switch 345 is connected by conductor 569 to the slider 562 of a voltage divider 563 having a winding 564 center tapped as at 565. Slider 562 is actuated by mechanical connection 206 to manual turn control knob 207. Slider 560 of voltage divider 556 is connected to the "Navigate" and "Glide" contacts of switch 345, while slider 557 of voltage divider 555 is connected to the "Outbound" and "Inbound" contacts of switch 345. The movable contact of switch 345 is connected by a conductor 566 to fixed contact 292 of switch F.

Center tap 565 of voltage divider 563 is connected to control ground conductor 534. Connected between conductors 566 and 534 is the winding 571 of a voltage divider 572 having a slider 573, a portion of the winding being metallized as indicated at 574. Slider 573 is actuated by mechanical connection 361 to vane 360, to comprise bank stall unit 52 of Figure 1.

Slider 573 is connected to fixed contact 291 of switch F by a conductor 575. Winding 564 of voltage divider 563 is energized from a secondary winding 577 of a transformer 580 whose primary winding 581 is energized by ground connection 582 and a conductor 583 leading to distribution terminal V. A conductor 576 is connected to movable contact 286 of switch F, and between this contact and ground conductor 534 appears a voltage which is supplied to the aileron and rudder control circuits of the automatic pilot.

Precession control component 497 includes secondary winding 502a of transformer 500, which energizes, through a dropping resistor 584, the winding 585 of a voltage divider 586 having a slider 587 and a center tap 590. Connected between slider 587 and center tap 590 is the winding 591 of a voltage divider 592 having a slider 593. Slider 593 is connected to the "Navigate" and "Glide" contacts of switch 344. Center tap 590 is connected to the "Off," "Inbound," and "Outbound" contacts of switch 344 by a conductor 594, which also comprises one of the output conductors from this component: the other output conductor 595 is connected to the movable contact of switch 344, and conductors 594 and 595 provide voltage for the controlled phase of the precessing motor of the directional gyroscope. Since directional gyroscopes with precessing motors are known in the art, no detailed showing of this structure is included in the present application.

Slider 587 is actuated by mechanical connection 512' to motor 492': this mechanical connection is continued, since its function is needed elsewhere in the coupler.

Switch 343 is shown as completing a circuit, in its "Navigate" and "Glide" positions only, between a pair of conductors 596 and 597. These conductors insert the switch in the line phase of the directional gyroscope precessing motor, to prevent single phasing of this motor when its controlled phase is deenergized at switch 344.

Switch 342 is shown as completing a circuit in its "Inbound" and "Outbound" positions, between a pair of conductors 598 and 599. As shown in Figure 5, completing the circuit between these conductors results in caging the directional gyroscope.

Instrument landing receiver 46 gives two outputs, one for controlling the horizontal movement of the craft and the other for controlling its vertical movement. Approach coupler 50' comprises a localizer channel and a glide path channel, designed to receive as inputs the outputs just described. Switch 348 shown in Figure 3 functions to complete the connection between the instrument landing receiver and the output of the glide path channel of approach coupler 50' when the switch is in its "Glide" position, and to prevent any output from being supplied by this channel of the coupler in any other position of the switch. Similarly switch 349 functions to complete the connection between the instrument landing receiver and the localizer channel of the approach coupler in all positions of the switch except the "Off" position: in this latter position the switch functions to insure that no output is derived from the localizer channel of approach coupler 50'. Since the functions of these switches are internal of the approach coupler and do not comprise an inventive contribution in the present application, no further details regarding their arrangement are considered pertinent.

The structure of attack angle sensing device 27 is given in Figure 6, to which reference should now be made. The body 600 of the device is made in two sections: in the figure the top section has been removed to display the internal construction of the device.

The shaft 601 of vane 360 extends transversely of body 600, and is received in suitable bearings 602 and 603. Shaft 601 carries within the body of the device a bevel gear 604, which meshes with a bevel pinion 605 carried by a stub shaft 606. Shaft 606 is mounted in an outboard bearing 607, and is connected by a flexible coupling 610 to the shaft of telemetric transmitter 362, which is suitably mounted in a partition 611 in the body 600 of the device. Thus any rotation of shaft 601 in response to the action of the relative wind on vane 360 results in rotation of gear 604, pinion 605 and therefore in operation of the telemetric transmitter.

Also carried on shaft 601 internally of the device are the sliders 375, 524 and 573 of voltage dividers shown in Figures 3 and 4. The sliders are insulated from the shaft and from each other, and contact windings 381, 522, and 571 respectively, which are carried by forms shown in section in the figure.

In the nose of the device there is mounted an electric heater 612 which can be energized to prevent icing of the device. Since it may be desired to have heater 612 in operation on the ground, for example, before the rest of the system is energized, heater 612 is shown in Figure 5 as being energized directly from the positive terminal of battery 120 through a switch 613 and ground connection 614. A signal lamp 615 is illuminated whenever switch 613 is closed, to indicate that the heating circuit is energized.

The various electrical connections necessary to proper operation of the device are made through a multi-contact connector shown at 616 in Figure 6. The rear portion of the unit is also machined as shown at 617 so as to be received within mounting strut 26, as is shown in Figure 2. It should be emphasized that vane 360 is symmetrical about the body of the device.

In Figure 9 there is shown the longitudinal section of an instrument for selecting and indicating attack angle. The instrument comprises a body 620 arranged on its under surface to receive the housing of telemteric receiver 364, which is fastened to it by suitable means indicated at 621. The shaft of transmitter 364 extends through body 620, and carries at its upper end the index 366. There is also provided a protecting cover 622 for receiver 364.

A recess 623 extends around a major portion of the circumference of the body 620, and clamped between insulating members 624 and 625 in this recess is a winding form 626 carrying separate windings 380 and 480 shown at the bottom of Figure 3. A central boss 628 extends upwardly from body 620, upon which index 383 is pivotally mounted. An insulating member 627 is fastened to index 383 by suitable means 630, and a gear 631 is fastened to member 627 by means 629. Gear 631 is driven by an idler gear 632.

Indexes 366 and 383 move with respect to a fixed scale 367 which, together with a cover glass 633 is clamped to body 620 by an outer ring 634. A face view of the instrument comprises a part of Figure 8, and it will be seen that the scale carried by member 367 extends only partially around the circumference of the instrument. Winding 380 is of the same angular extent, and a slip ring 635, also of the same angular extent, is carried by insulating member 625. At a point aligned with the zero of index 383, insulating member 627 carries a number of contact fingers 636 and 637, the former engaging slip ring 635, and the latter engaging winding 380 on form 626; these fingers together comprise slider 374 of Figure 3. It will be appreciated that angularly spaced from the winding 380 and fingers 636 and 637 there will be found another winding, another slip ring, and another set of sliders, comprising voltage divider 477 of Figure 3.

A shaft 640 extends through outer ring 634 and into body 620. At its upper end it carries knob 382, and near its lower end it carries a pinion 641 which engages gear 632 in driving relation therewith.

The control panel of the apparatus comprising the invention is shown in Figure 8. In the left hand portion of this figure is shown the control unit 642 for the automatic pilot. The power switch is shown at 123, the master engage switch at 153 and the turn control knob at 207. Knob 351 of the function selector is shown at the bottom of the right hand section of this panel, and above it are attitude indicator 102 and the scale 367 and indexes 366 and 383 of the attack angle sensing and indicating instrument. Knob 253 controlling the On and Engage relays is located directly above the attitude indicator, and knob 359 controlling the throttle ratio is located directly above the other instrument. Between these is located pilot light 334, and over this is switch 517.

In one successful embodiment of the invention, components having the values specified below were used.

| | |
|---|---|
| Battery 120 | 28 volts. |
| Output of inverter 124 | 115 volts, 400 cycles. |
| Secondary winding 577 | 35 volts. |
| Secondary windings 317, 331f, 502a, 502b, 502c, and 502d | 30 volts. |
| Secondary winding 331lb | 20 volts. |
| Secondary winding 333c | 15 volts. |
| Secondary windings 331a, 331c, 331d, 333a | 12 volts. |
| Secondary windings 331e | 10 volts. |
| Secondary winding 333d | 9 volts. |
| Secondary winding 333d | 5 volts. |
| Voltage divider 855 | 5000 ohms. |
| Voltage divider 854 | 3000 ohms. |
| Fixed resistors 413 and 883 | 2000 ohms. |
| Voltage divider 377 | 1800 ohms. |
| Voltage divider 376 | 1500 ohms. |
| Voltage dividers 407, 435, 450, 572 and 877 | 1000 ohms. |
| Variable resistors 379, 432, 433, 475, 521 and 530 | 1000 ohms. |
| Voltage dividers 416 and 886 | 800 ohms. |
| Fixed resistors 508 and 540 | 600 ohms. |
| Voltage divider 563 | 550 ohms. |
| Voltage dividers 463, 477, 514, 543, 555, 556, 591 | 500 ohms. |
| Variable resistors 878, 408, and 423 | 500 ohms. |
| Voltage dividers 507, 536, 550 and 586 | 340 ohms. |
| Voltage divider 523 | 300 ohms. |
| Voltage dividers 426 and 482 | 200 ohms. |
| Variable resistor 462 | 200 ohms. |
| Fixed resistor 484 | 200 ohms. |

Fixed resistors 546 and 584_____ 110 ohms.
Fixed resistances 474 and 485____ 100 ohms.
Fixed resistances 472 and 473____ 50 ohms.

*Operation*

In manual flight of the craft switch 123 is open. The automatic pilot, the approach coupler, and the attack angle system are all deenergized, and the only part of the entire assembly which can be energized is the heater coil 612 in the attack angle sensing device.

If it is desired to change to automatic flight, switch 123 is closed. The human pilot must also be sure that turn control knob 207 is in its central "Off" position, and that knobs 253 and 351 are also in their "Off" positions and that switch 517 is closed. If it is contemplated to fly at constant altitude when the attack angle control system is energized, switch 517 is thrown upwardly, while if constant attitude flight is planned, the switch is thrown downwardly. The pilot then closes switch 123, which starts inverter 124 and actuates power relay 127, supplying direct current for the servomotors of the automatic pilot on conductor 301, and energizing conductor 152 through disengage button 140. Conductor 152 energizes caging relay 189 through contacts 172 and 174 of relay 155 and conductor 201, and the caging winding 224 of motor 98 is energized from conductor 152 through contacts 192 and 194 of the caging relay. The motor runs until limit switch 230 is opened, caging the directional gyroscope. Even after the limit switch is opened a small amount of torque is maintained in motor 98 by conductor 234, resistor 235, conductor 201, fixed contact 171, movable contact 172, and conductor 152. Fixed contact 216 of roll erection cutout relay 210 is also energized from conductor 152 through movable contact 172, fixed contact 171, conductor 201, fixed contact 196, movable contact 193, and conductor 223. If control device 222 is operated while relay 189 is energized the resulting operation of relay 210 completes a holding circuit for relay 189 from conductor 152 through contacts 214 and 216 of relay 210, conductor 223, and contacts 193 and 196 of relay 189 to conductor 155; no subsequent deenergization of conductor 201 can then release relay 189 until relay 210 has also been deenergized by control device 222.

Operation of power relay 127 also supplies alternating voltage to distribution terminal V, and to various amplifiers, gyroscope rotors, and other components of the automatic pilot and the approach coupler as indicated at 312. Conductor 320 is energized with alternating voltage from transformer 314, and this in turn provides energy for roll erection torque motor 240 through contacts 213 and 215 of relay 210, unless device 222 energizes relay 210 to open the erection motor circuit at contact 213.

Transmitter 362 and receiver 364 of telemetric system 75 are energized from distribution terminal V, and indicator 366 gives a reading of the measured attack angle on scale 367. The pilot at once operates knob 382 to bring index 383 into agreement with index 366, thus setting sliders 374 and 476 with respect to their windings.

Alternating voltage from terminal V is transmitted through normally closed control device 311 to distribution terminal Y. Contact 272 of Engage relay 265 and phase controller 335 are supplied with energy from terminal Y: since relay 265 is not now energized, and since knobs 253 and 351 are in their "Off" positions, nothing results. Power is however, supplied to amplifiers 60, 71, and 90, which commence to warm up, and to the line phase of throttle reset motor 92. Transformers 322 and 323 are also supplied with power, and energize a number of circuits that will now be described.

An equalizing circuit may be traced from slider 885 through conductor 884, terminal 881, conductor 882, resistor 883, terminal 421, resistor 413, conductor 412, terminal 411 and conductor 414 to slider 415. The sliders are the output terminals of a bridge circuit 422, and slider 425 must be adjusted so that when the pressures in manifolds 865 and 395 are equal, sliders 885 and 415 are at the same potential. If thereafter the pressure in either manifold exceeds that in the other, a voltage of one of two opposite phases is impressed across resistors 883 and 413. Since the resistors are equal in value, the output of the bridge is divided equally and constitutes two voltages of the same magnitude and of opposite phase as viewed from terminal 421.

Resistor 883 is included in a left throttle position circuit which may be traced from signal ground conductor 372 through fixed contact 273 and movable contact 267 of switch A, conductor 875, slider 876, the portion of winding 880 to the right of the slider, terminal 881, conductor 882, and resistor 883 to terminal 421.

Resistor 413 is included in a right throttle position circuit which may be traced from signal ground conductor 372 through fixed contact 274 and movable contact 270 of switch B, conductor 405, slider 406, the portion of winding 410 to the left of the slider, terminal 411, conductor 412, and resistor 413 to terminal 421.

The potential of terminal 421 with respect to signal ground conductor 372 is thus the parallel sum of two voltages, the first of which is the sum of the voltage between slider 876 and terminal 881 and the voltage drop across resistor 883, and the second of which is the sum of the voltage between slider 406 and terminal 411 and the voltage drop in the resistor 413. Since the circuits under consideration are not of infinite impedance, the summation is not entirely perfect, but the error is not significant for the purposes of the invention.

The potential at terminal 421 is applied to input terminal 445 of throttle reset amplifier 90 through a reset circuit which may be traced from terminal 421 through conductor 430, terminal 431, variable resistor 433, the portion of the winding 434 of voltage divider 435 to the right of slider 436, the slider, conductor 437, movable contact 271 and fixed contact 276 of switch C, and conductor 446. Input terminal 443 of amplifier 90 is connected to signal ground conductor 372. Since amplifier 90 and the line phase of motor 92 are energized from distribution terminal Y, it follows that any voltage appearing between input terminals 445 and 443 of amplifier 90 results in operation of motor 92 in one direction or the other depending on the phase of the input voltage. Operation of this motor results in movement of slider 436 with respect to winding 434, in a direction tending to reduce the input to amplifier 90; when the input is reduced to zero, operation of motor 92 ceases. Velocity generator 94 is driven with motor 92, but its input circuit is interrupted at switch D and its output circuit is interrupted at switch C'.

An angle responsive reset circuit may be traced from signal ground conductor 372 through slider 375, bridge 370, slider 374, conductor 385, switch 350, terminal 851, and winding 852 of voltage divider 854. An angle responsive throttle circuit may be traced from signal ground conductor 372 through slider 375, bridge 370, slider 374, conductor 385, switch 350, terminal 851, and winding 853 of voltage divider 855. The voltages across windings 852 and 853 are accordingly equal to the unbalance voltage of bridge 370. A portion of this voltage determined by the position of slider 856 is impressed on moveable contact 268 of switch C' which is now open, and a portion of the same voltage determined by the position of slider 857 is impressed on fixed contact 275 of switch C, which is also now open.

The elevator, aileron, and rudder circuits of the automatic pilot are arranged to supply control voltages between ground and the input terminals of their respective amplifiers in accordance with the operation of the directional and vertical gyroscopes, of control surface position sensing devices, and of other variables of interest. A detailed disclosure of these circuits is not necessary to an understanding of the present invention: such a disclosure may be found in copending application, Serial No. 570,-712 of Kutzler and Wilson, filed December 30, 1944, now Patent No. 2,471,821, issued May 31, 1949, and assigned to the assignee of the present invention. The points in the elevator, aileron, and rudder circuits which would normally be grounded are disconnected from ground and connected to conductors 533, 576, and 576 as shown in Figure 4. Ground conductor 534 is connected to the ground terminals of the servomotor amplifiers so that when there is no potential difference between conductor 533 and conductor 534, the elevator circuit for the automatic pilot is unaffected by anything in the attack angle system or the approach coupler, and the same is true in the aileron and rudder circuits of the automatic pilot if conductors 576 and 534 are at the same potential.

An elevator control circuit may be traced from terminal 518 of switch 517 through conductor 486, slider 476, bridge 469, slider 481 and conductor 487 to terminal 519 of switch 517. If switch 517 is closed downwardly, conductor 486 is connected directly to conductor 489, and bridge 469 is cut off from the elevator control circuit of the automatic pilot. The pitch attitude of the craft is then unaffected by change in selected attack angle, and flight at a constant attitude and varying altitude results from the operation of the attack angle system. Let this be the condition of switch 517 first assumed.

Under the conditions just described, conductors 533 and 534 are at the same potential: by tracing the elevator circuit it will be seen that conductor 533 is connected directly with conductor 489 by switch 347, that conductor 489 is connected directly with conductor 486 by switch 517, and that conductor 486 is connected directly to control ground conductor 534 by contacts 287 and 294 of switch G.

In the same fashion conductor 576 is directly connected to conductor 566 through contacts 286 and 292 of switch F, conductor 566 is connected directly to conductor 569 through switch 345, and conductor 569 is connected directly to control ground conductor 534 since slider 562 is at center tap 565 of voltage divider 563. Accordingly the rudder and aileron control circuits of the automatic pilot are in their normal condition.

No correcting voltage is supplied to the precessing motor of the directional gyroscope, by reason of the fact that conductor 595 is connected directly to conductor 594 through switch 344, thus short circuiting the control phase of the precessing motor: the line phase of this motor is moreover interrupted at switch 343.

When the various amplifiers in the automatic pilot have reached a stable operating temperature, and when the aerodynamic trim of the craft and the electrical trim of the automatic pilot have been coordinated and other necessary preliminaries have been accomplished, automatic flight is established by the human pilot, by momentarily pressing on master switch 153, which energizes master relay 144. Moveable contacts 141, 142, and 143 of this relay engage their fixed contacts to energize the windings of relays 154, 155, and 156. As these relays move into their energized positions, each completes its own holding circuit, and the respective armatures also actuate further switch assemblies resulting in the flow of power to the servomotors, through conductor 301, in accordance with the outputs of the control surface circuits. Push button 153 may now be released, as the relays 154, 155 and 156 now remain in their energized positions until master disengage button 140 or one of the individual disengage buttons 167, 177, and 187 is momentarily actuated. Movable contact 251 of switch 252 is now energized with direct voltage from fixed contact 132 of power relay 127 through master disengage button 140, conductor 152, contacts 182 and 183 of elevator relay 156, and conductor 185.

The craft now proceeds under normal control of the automatic pilot. If for any reason its heading changes from that stabilized by the directional gyroscope, or if its attitude changes about its roll or pitch axes, proper corrections are made in response to outputs from the directional and vertical gyroscopes to return the craft to the condition originally stabilized. If for any reason the manifold pressures of the two engines become unequal, voltages appear across resistors 883 and 413, and if the pilot decides to change the throttle settings by operating the manual levers of one or both throttles, one or both of sliders 876 and 406 are moved to new positions on their respective windings, and new voltages between these sliders and terminals 881 and 411 respectively become effective. As a result amplifier 90 is energized and motor 92 operates to readjust the setting of slider 436 until the input to the amplifier is again returned to zero.

Automatic control of the craft having been established as just described, it is possible to superimpose thereon control by the approach coupler, or partial or full control by the attack angle system, or control jointly by the attack angle system and the approach coupler, depending upon whether knob 351, or knob 253, or both are operated. Suppose first that knob 253 is moved from its "Off" position to its "On" position. Under these conditions On relay 283 is energized with D. C. from contact 132 of power relay 127 through conductor 300, radio noise filter 297, conductor 296, contacts 255 and 260 of switch 256, and ground connections 295 and 121. Relay 283 moves into its energized position, operating switches E, F, and G.

By operation of switch E, the circuit to signal light 334 is completed and the light is illuminated in accordance with the output from transformer windings 331a and 333a. If these transformers are both in satisfactory operation, full illumination of lamp 334 takes place. If either transformer is not operating properly, the lamp is illuminated at reduced brilliance, and if neither transformer is operating, the lamp is not illuminated at all. By this means the human pilot is given an opportunity to assure himself that proper power supply for the attack angle control system is being maintained.

No change in the structure shown in Figure 3 results from energization of relay 283, but in Figure 4 moveable contact 287 of switch G is moved out of engagement with fixed contact 294 and into engagement with fixed contact 293. Conductor 486 is thus no longer connected directly to control ground conductor 534, but is connected by conductor 528 to the slider 524 of stall prevention voltage divider 523. As long as the measured attack angle is less than the predetermined safe value, slider 524 moves along the metallized portion 525 of voltage divider 523, and conductor 486 is effectively connected to control ground conductor 534. However, if the measured attack angle exceeds the safe value, slider 524 moves off the metallized portion 525 of winding 522 and onto the resistance portion of the winding, and a voltage is added in the elevator circuit depending upon the amount of displacement of slider 524 from the left hand end of the winding as seen in Figure 4. The rate at which the voltage changes with displacement of the slider may be characterized by adjustment of variable resistor 530 so that it is non-linear, if this is desired.

Thus, whenever the measured attack angle assumes a dangerous value, a voltage is added in the elevator circuit of the automatic pilot entirely distinct from any other voltage in that circuit, tending to cause operation of the elevator servomotor in such a sense as to decrease the attack angle, and this voltage persists until the measured attack angle is reduced to a safe value, regardless of any operation of the automatic pilot.

Movement of rudder relay 155 into its energized position, by reason of operation of master switch 153, results in interruption of the circuit through contacts 172 and 174 of relay 155, connecting conductor 152 with conductor 201. This will ordinarily cause relay 189 to return to its deenergized position, but if control device 222 is energizing the winding of relay 210, the holding circuit through conductor 223 for relay 189 is completed and the latter relay remains energized, until control device 222 opens the circuit between conductors 152 and 221. Thereupon relay 210 is deenergized, the holding circuit for relay 189 is broken, and relay 189 returns to its normal or deenergized position. In this position of relay 189 electrical connection is made from conductor 152 through contacts 192 and 195 of relay 189 to the uncaging winding 225 of motor 98. Operation of the motor continues therefore until the gyro is uncaged and limit switch 231 is operated to open the circuit. The directional gyroscope is now free to stabilize the heading of the craft through the aileron and rudder circuits.

It is sometimes desirable to produce a permanent change in the heading of the craft without releasing automatic control by the automatic pilot. For this purpose turn control knob 207 is provided. When shaft 206 driven by this knob is in a central position, movable contact 202 does not engage either of fixed contacts 204 and 205, as seen in Figure 5, and slider 562 engages center tap 565 of voltage divider 563, as shown in Figure 4. Rotation of knob 207 operates to energize conductor 201 from conductor 152 through contact 202 and contact 204 or contact 205, and also to displace slider 562 from center tap 565, so that a voltage appears between conductors 534 and 576, which is to say in the aileron and rudder circuits of the automatic pilot. So long as slider 562 is displaced from center tap 565, the voltage in the aileron and rudder circuits of the automatic pilot continues, and the craft continues to turn. When the slider is returned to its central position, the voltage in the aileron and rudder circuits returns to zero and normal stabilization of the craft in straight line flight is resumed.

Connection of conductors 201 and 152 as the switching function of knob 207 results in energization of caging relay 189 and of caging winding 224 of caging motor 98 as previously described. So long as the knob is displaced from its central position, the caging motor of the gyroscope maintains the gyroscope caged. When the knob is returned to its central position, connection between movable contact 202 and the fixed contact is interrupted, interrupting energization of caging relay 189 and therefore causing uncaging of the gyroscope by energization of winding 225 from motor 98.

The desirability of caging the directional gyroscope at certain times, and also the purposes served by cutting out the erection of the vertical gyroscope around the roll axis at certain times, are based on principles well known to those skilled in the art which have been discussed in many places. This discussion will not be repeated here.

It is well known that when a craft in straight flight is approaching a stall condition, it is effective to apply down elevator to correct this condition. However, when a craft approaches a stall condition during turning rather than straight flight, operation of the ailerons and rudder in addition to operation of the elevator is the proper corrective measure to be applied. In the present invention turn of the craft is caused by the voltage appearing between conductor 566 and conductor 534, and approaching stall conditions are brought about by applying an unduly high voltage by means of unduly large displacement of slider 562 from center tap 565, or of slider 551 from center tap 552. The correction is accomplished by applying the voltage resulting from a displacement of either of these sliders into the aileron and rudder circuits of the automatic pilot, not directly but through bank stall prevention voltage divider 572 whose output is supplied to the aileron and rudder circuits of the automatic pilot. Thus one end of winding 571 of voltage divider 572 is connected to control ground conductor 534, like center taps 565 and 565, while the other end of the winding is connected to conductor 566. Operation of switch F due to movement of knob 253 into its "On" position disconnects conductor 576, leading to the aileron and rudder circuits, from conductor 566, and connects it instead to slider 573 of voltage divider 572, so that the position of that slider determines the proportion of the actual turn control voltage which is made available to the aileron and rudder circuits. So long as the attack angle is no greater than the selected safe value, slider 573 engages metallized portion 574 of winding 571, and the total turn control voltage is supplied in the circuits of the automatic pilot. However, if the attack angle increases beyond the safe value, slider 573 moves onto the resistance portion of winding 571, and the amount of the turn control voltage actually reaching the automatic pilot circuit is reduced.

The result of operating knob 253 into its "On" position is therefore to superimpose upon normal control of the craft by the automatic pilot, a further control to the extent necessary to retain the craft within a safe attack angle, whether the craft is in straight flight or in turning flight.

Full control by the attack angle apparatus is established by moving knob 253 into its "Engage" position. This brings about no change in the straight and bank stall prevention circuits just described, since On relay 283 remains energized, but it does result in the energization of Engage relay 265 from conductor 185 through switch 252, which results in the actuation of switches A, B, C, C', and D. To understand the results of this operation, reference should again be made to Figure 3.

As shown in the left central portion of the figure, operation of switch D energizes the line windings of throttle motors 56 and 67, and also the primary winding of velocity generator 94. Operation of switch A in the upper left-hand corner of the drawing converts the left throttle position circuit into a throttle control circuit by ungrounding conductor 875 and connecting it to the input terminal 873 of amplifier 60 by conductor 874. Similarly, operation of switch B in the upper right hand portion of the drawing, converts the right throttle position circuit into a throttle control circuit by ungrounding conductor 405 and connecting it to the input terminal 403 of amplifier 71 by conductor 404. The angle responsive reset circuit is connected to input terminal 445 of amplifier 90 through conductor 444, contacts 268 and 269 of switch C', conductor 454, the portion of winding 451 to the right of slider 447, the slider, and conductor 446. Operation of switch C converts the reset synchronizer circuit into a simple reset circuit, by disconnecting conductor 437 from the input to amplifier 90 at contacts 276 and 271, and also completes the input circuits to amplifiers 60 and 71 by connecting slider 857 to conductor 437.

There is now impressed upon the input to amplifier 60 the sum of four voltages, that between slider 876 and terminal 881, that across resistor 883, that between terminal 431 and slider 436, and that between slider 857 and signal ground conductor 372, the latter voltage being a portion of the output from bridge 370 determined by the position of slider 857. Amplifier 60 energizes motor 56 for operation in accordance with the magnitude of the sum of these voltages, and motor 56 operates until slider 876 takes a new position on winding 880 such that the sum of the voltages on the input to amplifier 60 is zero. At the same time throttle 41 is adjusted, and this in turn varies the manifold pressure and hence the voltage drop across resistor 883.

The voltage on the input to amplifier 71 is similarly made up of the sum of the voltage between slider 406 and terminal 411, the voltage across resistor 413, the voltage between terminal 431 and slider 436, and the voltage between slider 857 and signal ground conductor 372. Amplifier 71 energizes motor 67 in accordance with the sum of these voltages, and the motor moves slider 406 until the sum of the voltages on the amplifier is reduced to zero, at the same time changing the setting of throttle 41. This likewise results in a change in the manifold pressure and hence in the voltage drop across resistors 883 and 413. Change in either manifold pressure obviously changes the voltage on the inputs of both amplifier 60 and amplifier 71. If the sense of the voltage difference between sliders 885 and 415 is such that the voltage drop in resistor 883 taken by itself would impress a voltage of a first phase on the input to amplifier 60, the voltage drop in resistor 413 is of such a phase that if taken by itself it would produce a voltage of the opposite phase on the input terminal 403 of amplifier 71, and the voltage drops reverse in phase simultaneously with change in the sense of the inequality between the voltages at sliders 885 and 415.

As long as bridge 370 is unbalanced, a voltage appears impressed between terminal 851 and signal ground conductor 372, and a portion of this voltage is impressed on the input to amplifier 90 through slider 856 conductor 444, switch C, conductor 454, the portion of winding 451 to the right of slider 447, the slider, and conductor 446. This voltage is now opposed, however, by an output from generator 94 which varies in accordance with the speed at which the generator is driven, that is, in accordance with the speed of motor 92, reversing in phase with reversal in the direction of operation of the motor, but remaining essentially of the same frequency. The result of this arrangement is that as long as bridge 370 is unbalanced motor 92 operates at a speed proportional to the amount of unbalance of bridge 370, thus continuously changing the setting of slider 436 on winding 434 and therefore the voltage between that slider and terminal 431. The inputs to amplifiers 60 and 71 are thus continuously changing as long as bridge 370 is unbalanced. At any time the position of slider 436 is a measure of the time integral of the unbalance voltage of bridge 370.

For any amount of unbalance of bridge 370 the voltages impressed on amplifiers 60 and 71 become zero when the remaining voltages in the respective input circuits are equal and opposite to the unbalance voltage, regardless of whether bridge 370 is itself rebalanced. However, the input to amplifier 90 can remain zero only when the output from bridge 370 is zero; as long as bridge 370 is unbalanced, motor 92 continues to operate, continuously changing the voltages in the inputs to amplifiers 60 and 71, and hence readjusting throttles 40 and 41. When bridge 370 is finally balanced, by changes in the measured attack angle resulting from operation of throttles 40 and 41 and the resulting change in power and hence air speed, operation of motor 92 stops. Neglecting the subordinate effect of the equalizing circuit if the manifold pressures are not equal, the voltage in the reset circuit is then equal and opposite to the voltage in the throttle position circuit, and the entire system is in balance. This is the condition which should prevail when knob 253 is advanced to its "Engage" position, for most satisfactory operation of the system, and is brought about by operation of motor 92, after knob 382 is set so that indexes 383 and 366 agree, to reduce the output of bridge 370 to zero.

The normal condition of the throttle control system is that in which bridge 370 is balanced, sliders 885 and 415 are at the same potential, and no inputs are impressed on amplifiers 60, 71 and 90. If under these conditions the measured attack angle changes for some reason, slider 375 is displaced along winding 381. Bridge 370 is unbalanced, and amplifier 60 energizes motor 56 to adjust slider 876, changing the output from voltage divider 877 by an equal and opposite amount, and simultaneously adjusting throttle 40. At the same time amplifier 71 energizes motor 67 to adjust slider 406, changing the output from voltage divider 407 by an equal amount, and simultaneously adjusting throttle 41.

In response to changes in the throttle settings, the measured attack angle changes. For any fixed condition of flight—air density, load of the craft, location of the center of gravity, etc.—voltage divider 855 may be adjusted so that the displacement of slider 876 in response to unbalance of bridge 370 is accompanied by change in the throttle setting tending to restore the measured attack angle to the selected value. The speed of motors 56 and 67 is so great, compared to the speed at which slider 436 is driven through reduction gear 439, that for such conditions motor 92 has essentially no effect on the system. Thus temporary changes in attack angle, due for example to buffeting of the craft by rough air, are continuously corrected.

If the condition of flight changes permanently, however, as by a decrease in the load resulting from consumption of fuel, a permanently different power setting is required if the same attack angle is to be maintained. In the absence of the reset circuit, the result is that as the flight conditions depart more and more widely from those for which the slider 436 of voltage divider 435 was set the measured attack angle departs more and more from that selected, a permanent unbalance in bridge 370 being opposed by voltage from divider 877 to give a zero input to amplifier 60. The difference between the selected and measured attack angles as the conditions of flight vary is the "droop" of the system, and the purpose of the reset circuit is to remove this droop by continuously changing the voltage in the inputs to amplifiers 60 and 71 in the same direction as any unbalance in bridge 370, thus causing further operation of the throttle motors which results in bringing the measured attack angle to the desired value. This is done by applying the unbalance of the bridge 370 to control the direction and speed of reset motor 92, so that any permanent unbalance will cause a gradual shift in the position of slider 436. The general principle of reset or integral control is one familiar to those skilled in the art, and will be discussed no further here; its application to the present situation, is believed to be novel, and has been so fully and clearly described and explained herein as to be readily understandable to those skilled in the art.

Not only can temporary and permanent changes in the attitude and flight condition of the craft be corrected, according to the system, but the human pilot is at liberty to vary the angle of attack at will. Thus if knob 382 is adjusted so that slider 374 takes a new position on winding 380, bridge 370 is unbalanced and motors 56 and 67 operate. If a temporary condition of zero input to amplifier 60 is reached while bridge 370 is still unbalanced, this condition is corrected by motor 92 as described above.

It was pointed out that throttles 40 and 41 can be actuated by the human pilot by means of manual levers 42 and 43, regardless of what motors 56 and 67 are doing. If such a manual movement of lever 42, for example, is to be made for some reason, it is desirable to move knob 253 back to its "Off" position. Undesired operation of motor 92 otherwise follows upon the unbalance of bridge 370 resulting from the change in throttle, if the knob is left in its "Engage" position, while undesired operation of motor 92 follows upon displacement of slider 876 with the throttle movement, if the knob is left in its "On" position.

It should probably be pointed out that the entire system is based on voltage considerations: each signal circuit works into an amplifier having such a high input impedance that current in any signal circuit may be neglected. Thus for example it may be considered that there is no voltage drop across resistor 883 when sliders 885 and 415 are at the same potential.

In the foregoing description it has been assumed that switch 517 was thrown downwardly, to prevent change in the pitch attitude control component of the system as selected attack angle is adjusted, so that constant attack angle, constant attitude flight results, at the expense of varation in altitude. If switch 517 is thrown upwardly, substantially level flight at a constant attack angle is obtained, at the expense and change in pitch attitude with selected attack angle. This follows upon the fact that if the rate of climb of a craft is maintained zero, and its attack angle is adjusted by controlling power, the pitch attitude of the craft changes numerically with change in attack angle. Hence if the pitch attitude of a craft is known for a selected attack angle, and it is desired to change the attack angle while maintaining level flight, a change in the pitch attitude equal to the change in attack angle must be caused. Figure 3 shows means including bridge 469 for accomplishing this.

If switch 517 is to be thrown upwardly, this must be done before the craft is trimmed up. Slider 481 is set on winding 483 to a position where the output of bridge 469 is zero when slider 476 is in a position corresponding to the most useful attack angle of the craft. Knob 382 is then set as before, so that indexes 383 and 366 are aligned, thus bringing slider 476 to some particular position on winding 480, probably not one in which bridge 469 is balanced. Accordingly a voltage appears between conductors 486 and 487, that is, between conductors 533 and 534, by reason of the position of switches 517 and 347. In establishing the elevator trim of the automatic pilot this voltage is counteracted by a suitable setting of a trim adjusting device, so that the pitch axis control of the automatic pilot is balanced. After the automatic pilot is placed in control of the craft, any change in selected angle of attack, as set by knob 382, causes an equal change in the pitch attitude which the automatic pilot stabilizes, the equality being brought about by adjustment of variable resistor 475, so that variation in power to maintain proper attack angle is accompanied by change in attitude of the same extent. Flight at a constant altitude is thus possible, since by reason of motors 56, 67 and 92 the measured attack angle is always maintained equal to that selected.

It has previously been stated that control of the craft through the automatic pilot can be exerted not only by the attack angle system but also by the approach coupler. This type of control is exercised when knob 253 is left in its "Off" position and function selector knob 351 is operated away from its "Off" position. Most phases of the operation of the approach coupler are disclosed in detail in the copending application of Alderson and Carpenter referred to above, and are not considered inventive contributions to the present application for that reason. Since these components of the invention function the same whether the coupler is used alone or in conjunction with the attack angle system, the combined operation of the two systems will now be described. Operation of the complete system is most satisfactory when switch 517 is thrown downwardly as seen in Figure 4.

Briefly restated, instrument landing receiver 46 gives a first voltage, for controlling the heading of the craft, which reverses in polarity when the craft moves from one side of the "localizer path" of the landing beam to the other. The voltage depends only on the geographical position of the craft with respect to the beam and not on its heading; hence if control of the craft from this voltage is arranged to cause a craft flying towards the station to move nearer to the center of the beam, the control would operate on a craft flying away from the station to cause it to move further from the center of the beam. Reversibility of the sense of operation of the control is therefore necessary, and is supplied by phase controller 335, which automatically supplies a voltage of one phase in the "Outbound" position of switches 341 and 340, and a voltage of the other phase in the "Inbound" and "Glide" positions of switches 341 and 340. In the "Navigate" position of these switches either phase may be selected by the human pilot by operation of reversing switch 355.

Suppose that normal flight under the control of the attack angle apparatus has been established, and that it is now desired to land at an airport being approached. The craft is directed to the vicinity of the airport by radio ranges or other conventional means, and caused to fly over the airport and away from the landing strip, following the landing beam outward. The craft will of course have been brought from its cruising altitude of say 7000 feet above ground to a suitable approach altitude of say 1500 feet by use of pitch adjusting means in the automatic pilot. The indicator of receiver 46 is observed, and when it appears that the craft is proceeding directly along the beam, function selector 351 is moved from "Off" to "Outbound."

Switches 340 and 341 now supply alternating voltage of a first phase to transformer 500, energizing voltage dividers 514, 543, 550 and 586. Switch 342 cages the directional gyroscope of the automatic pilot. No change is brought about by switches 343 and 344. Switch 345 functions to supply between conductors 569 and 566 a portion of the output from voltage divider 550, which is adjusted by motor 492' in accordance with departure of the craft from the beam. The voltage so supplied is the greater of two voltages available, one at slider 557 and one at slider 560. This voltage is applied to the rudder and aileron control circuits of the automatic pilot through the circuit previously traced between conductors 576 and 534. By this means turn of the craft in response to departure thereof from the landing beam is accomplished. The bank stall prevention circuit functions in this case, as in the case of a manually initiated turn, to reduce the signal as the craft approaches a stall condition, but ordinarily the maximum voltage available from divider 550 is adjusted by proper selection of resistor 546 to make this unnecessary.

Switches 346, 347 and 348 bring about no changes in the apparatus. Switch 349 completes a connection in coupler 50 which results in proper operation of motor 492' in accordance with departure of the craft from the desired path. Switch 350 brings about no change in the apparatus. It will at once be apparent that the control changes brought about in the "Outbound" position of the function selector are related only to the heading of the craft, and that its throttle and elevator controls remain unaffected.

After the craft has reached a sufficient distance from the air port, function selector 351 is moved to its "Inbound" position. This reverses the phase of the alternating voltage supplied by phase controller 335, by operation of switches 340 and 341, and any slight signal from receiver 46 is now sufficient to cause the craft to begin to move further away from the beam instead of toward it. The craft makes a turn of at least 90°, after which the signals are in proper sense to cause return to the beam instead of departure therefrom, and the craft settles down on the beam again. No other change in the apparatus results from this operation of the function selector.

Receiver 46 simultaneously supplies a second output, for controlling the elevation of the craft, which reverses in polarity when the craft moves from below the beam to above it. The beam has a uniform slope, upward away from the touchdown point, which is generally 2½°. At the present distance of the craft from the airport, it is located under the beam, but as it continues in straight level flight towards the field it intersects the beam from below, as is made apparent by the indicator of receiver 46. When it appears that the craft is on the "glide path" as well as on the "localizer path," function selector 351 is advanced to its "Glide" position, so that the craft may be controlled in elevation as well as in heading.

No change in the apparatus is caused by switches 340 and 341, since the direction of the craft's movement with respect to the field remains the same. The directional gyroscope is uncaged by switch 342, the line phase of its precession motor is energized by switch 343 and its controlled phase is connected, through conductors 594 and 595, to the output of component 497 of the coupler. Thus whenever the craft departs from the desired localizer path the precession motor of the gyroscope acts to change the direction of the stabilizing axis. The directional gyroscope thus acts as a reset on the heading of the craft, correcting for any permanent unbalance such as mistrim, inaccurate original alignment with the beam, shift in cross wind, etc.

Switch 345 supplies to the turn component of the automatic pilot a reduced voltage from component 496 of the coupler. Since the craft is approaching the ground, it is not advisable to have so great a control signal to the automatic pilot resulting from any given displacement of the craft from the center of the beam: hunting is also thus prevented.

Switch 346 supplies between conductors 466 and 467 a voltage from coupler component 495 which varies with departure of the craft in elevation from the glide path. This voltage is adjusted by motor 492, through mechanical connection 512 to slider 537.

Switch 347 applies between conductors 533 and 489 a voltage from coupler component 495 which also varies with departure of the craft in elevation from the glide path, motor 492 also adjusting slider 510 by mechanical connection 512. The circuit for the elevator control of the automatic pilot has been traced from conductor 533 to conductor 534, and the functioning of the straight stall prevention circuit previously described applies equally well now, a further voltage acting in a sense to give down elevator being added in the circuit whenever the attack angle exceeds the safe value.

Switch 348 completes a connection in coupler 50 which results in the operation of motor 492 just described. Switch 349 causes no change in the circuit, since control of the heading of the craft must still be maintained.

Switch 350 operates to add in the throttle control system not only the voltage on conductors 466 and 467, derived from coupler 50, but also a further voltage from glide preset circuit 459. The throttle circuit in Figure 3 between terminal 461 and terminal 851 now includes the portion of winding 464 to the left of slider 465, the slider, conductor 466, the portion of winding 545 (Figure 4) below slider 544, the slider, switch 346, conductor 467, and switch 350 (Figure 3). The throttle control circuit is thus changed by the addition of two voltages in series, the glide path preset voltage which corrects the apparatus so that it follows a sloping rather than a horizontal line of flight by effectively increasing the selected attack angle by 2½ degrees, and the coupler output voltage which corrects for departure from the sloping line of flight. Automatic control of the craft in azimuth and elevation now continues until the human pilot is ready to take over for a landing, which is done by momentary operation of the master disengage button 140.

A number of modified structures are believed to be included within the scope of the invention. Thus in Figure 10 there is shown a fragment of the apparatus shown in Figure 3, in which throttle equalization has been entirely eliminated, and in which the throttle control systems are rebalanced in accordance with manifold pressure, rather than in accordance with throttle position. In Figure 10 mechanical connection 57 extends from motor 56 to throttle 40, but does not extend to slider 876 of voltage divider 877. This latter slider is operated by a mechanical connection 625 from manifold pressure responsive device 890. Conductor 882 is connected directly to terminal 421 instead of being connected thereto through an equalizing resistor. In the same way mechanical connection 65 between motor 67 and throttle 41 is not continued to slider 406 of voltage divider 407, but the latter is actuated by a mechanical connection 626 from manifold pressure responsive device 420. Terminal 411 is likewise connected directly to terminal 421. The other connections remain the same as shown in Figures 3, 4 and 5.

While not so perfect as that shown in the more complete figure, the structure shown in Figure 10 has the advantage of simplicity and reduced expense, and may be resorted to where these advantages outweigh the relative imperfections of the system. The operation of the apparatus shown in Figure 10 will at once be apparent to one who is familiar with the circuits shown in Figures 3, 4 and 5, and will therefore not be repeated.

Figure 11 is also a fragmentary view showing a modification of the structure of Figure 3. In this form of the invention the apparatus is a "floating system" rather than a "rebalancing system," no means being provided for rebalancing the throttle control circuits either from throttle position or from manifold pressure. Means are provided, however, for equalizing the signals going to the two throttle control motors 56 and 67 in accordance with the relationship between the manifold pressures of the two engines: in this case the equalization is accomplished by transformer means rather than resistance means.

Sliders 885 and 415 of equalizing circuit 429 are connected to the terminals of the primary winding 830 of a transformer 827 having a secondary winding 831 with a center tap 632 connected to conductor 360 of Figure 3. Amplifier 90, motor 92 and associated components are not needed in this modification of the invention. Conductors 874 and 404, leading from the input terminals 873 and 403 of the throttle control amplifiers 60 and 71, are connected to the ends of secondary winding 631. It will thus be apparent that whenever sliders 885 and 415 are not at the same potential a voltage is impressed across primary winding 630, and voltages inductively appear in the two halves of secondary winding 631, of opposite phase with respect to center tap 632. These voltages are added in series with the voltage from the unbalance of the attack angle bridge, in such a manner as to oppositely modify the voltages supplied to amplifiers 60 and 71, thus affecting the operation of motors 56 and 67.

Motors 56 and 67 in this embodiment of the invention are preferably provided with velocity generators which are arranged in association with the motors and amplifiers to function in the same fashion as do motor 92, amplifier 90 and velocity generator 94 in Figure 3. The speed of each of motors 56 and 67 in Figure 11 is therefore regulated in accordance with the amount and sense of error in attack angle, decreasing as the desired angle is approached.

The difference in operation between the structure of Figure 11 and that shown in Figures 3, 4 and 5 is basically the difference in operation between a floating system and a rebalancing system. At any time there is a difference between the selected attack angle and the measured attack angle, a voltage is supplied through secondary winding 631 to amplifiers 60 and 71, and throttles 40 and 41 are actuated by motors 56 and 67, not to take a position in which the signal from the attack angle bridge is balanced out, but to operate until the measured attack angle itself changes to the value selected, and the inputs to amplifiers 60 and 71 become zero. When this condition is reached, the throttle control systems are again in balance.

It will be appreciated of course that the transformer type of equalizing can be substituted for the resistance type of equalizing in a rebalancing system of the type shown in Figure 3, if this is desired.

Figure 12 shows a modification of structure for supplying signals to the elevator control circuit of the automatic pilot. In the lower left hand portion of this figure are shown components of Figure 3. In the upper left hand corner of Figure 12 are shown the straight stall prevention components of Figure 4, and at the center upper portion of Figure 12 there is shown a fragmentary portion of Figure 4 indicating how the apparatus is energized.

In addition to structure previously described, the structure of Figure 12 includes a further amplifier 650 and a further motor 651, a voltage divider 652 having a winding 653 and a slider 654, a transformer 655 having a primary winding 656 and a secondary winding 657, a pair of equal fixed resistors 660 and 661, a voltage divider 662 having a winding 663 and a slider 664, a fixed resistor 665, a voltage divider 666 having a winding 667 and a slider 670, and a relay 671 including a winding 672 which energizes an armature 673 to move a pair of movable contacts 674 and 675 out of normal engagement with a pair of fixed contacts 676 and 677 and into engagement with a second pair of fixed contacts 680 and 681.

Motor 651 is connected in driving relation to slider 664 of voltage divider 662 by a mechanical connection 700. The line phase of motor 651 is energized through ground connection 682 and a conductor 683 leading to distribution terminal Y. The amplifier phase of motor 651 is energized through a cable 684 from amplifier 650, which is provided with power through ground connection 685 and a conductor 686 leading to distribution terminal Y. Input terminal 687 of amplifier 650 is connected to control ground conductor 534. Input terminal 691 of amplifier 650 is connected by conductor 692 to movable contact 675 of relay 671.

Fixed contacts 677 and 681 of relay 671 are energized from secondary winding 657 of transformer 655. The primary winding of this transformer is energized from signal ground conductor 372 and from slider 654 of voltage divider 652, winding 653 of which is connected between signal ground conductor 372 and terminal 851 of the throttle control circuit, the latter connection being made by a conductor 693.

Fixed contact 677 of relay 671 is connected by a conductor 694 with slider 664 of voltage divider 662, whose winding 663 is energized from a further secondary winding 333e of the transformer 323. Resistors 660 and 661 in series are also energized from winding 333e: the common terminal 695 between resistors 660 and 661 is connected to control ground conductor 534, as is fixed contact 676 of relay 671. Winding 663 of voltage divider 662 and fixed resistors 660 and 661 make up a bridge circuit 659. Connected in a series circuit between control ground conductor 534 and conductor 664 are fixed resistor 665 and winding 667 of voltage divider 666. Slider 670 of voltage divider 666 is connected to fixed contact 680 of relay 671. Winding 672 of the relay is energized through ground conductor 695 and a conductor 696 leading to fixed terminal 258 of switch 252. Movable contact 287 of switch G is connected directly to conductor 489, switch 517 being eliminated. Bridge 469 is not used in this embodiment of the invention.

The throttle control system operates exactly the same whether the elevator control components of Figures 3 and 4 or those of Figure 12 are used. Relay 671 is energized only when switch 252 is moved into its "Engage" position. For the other positions of switch 252 conductor 489 is grounded through switch G, conductor 697, contacts 674 and 676 of relay 671 and control ground conductor 534. In this condition of the relay input terminal 691 of amplifier 650 is connected through movable contact 675, fixed contact 677, and conductor 694 to slider 664 of voltage divider 662, and input terminal 687 of amplifier 650 is connected by control ground conductor 534 to the common terminal 695 between fixed resistor 661 and 660. Since these resistors are of equal resistance, a voltage will be impressed upon the input to amplifier 650 whenever slider 664 is not at the center of winding 663. Motor 651 is accordingly energized, actuating slider 664 through mechanical connection 700 until it takes its central position, when the amplifier is deenergized. Automatic centering of slider 664 is thus provided.

When switch 252 is actuated into its "Engage" position, relay 671 is energized in addition to the functions previously discussed, and movable contacts 674 and 675 move into engagement with fixed contacts 680 and 681 respectively. The input circuit to amplifier 650 may now be traced from terminal 691 through movable contact 675, fixed contact 681, secondary winding 657, conductor 694, slider 664, bridge 659 and control ground conductor 534 back to input terminal 687 of the amplifier. This circuit includes two sources of voltage, bridge 659 and secondary winding 657 of transformer 655, the latter providing voltage at any time that the attack angle bridge is unbalanced. Amplifier 650 accordingly energizes motor 651 to adjust slider 664 until the input to amplifier 650 becomes zero again. When this condition is reached the potential of slider 664 with respect to control ground conductor 534 is a measure of the output from secondary winding 657, which in turn is proportional to the unbalance in the attack angle bridge, and of the voltage between slider 664 and control ground conductor 534 a portion determined by the magnitude of resistance 665 and the setting of slider 670 is impressed between fixed contact 680 of relay 671 and control ground conductor 534. Since movable contact 674 now engages fixed contact 680, this voltage is applied in the elevator control circuit of the automatic pilot, to operate the elevators in accordance with error in attack angle.

In the foregoing specification there have been disclosed the structure and operation of aircraft control apparatus for maintaining the attack angle of the craft constant by adjusting the throttles or elevators or both, the apparatus further maintaining the altitude or the attitude constant. Two different elevator control means have been shown, and three different throttle control details have been given, applying the principles of the invention to a floating system and to a balanced system. Two different means for equalizing control in accordance with the relation between the manifold pressures of the two engines of the craft are included, and there are also disclosed means for rebalancing the system both by throttle position and by manifold pressure.

Means are also disclosed for overriding the attack angle control signals whenever the attack angle exceeds a safe value, both when the craft is in straight flight and when it is banking. The system is specifically arranged for cooperating with an instrument landing installation, and in order to permit flight at a constant pitch attitude down the selected glide path a glide path preset arrangement is included. Mechanical details of a vane-actuated attack angle responsive device and of a combined selecting and indicating device for attack angle, are also included.

Numerous objects and advantages of the invention have been set forth in the foregoing description, together with details of the structure and function of the invention, and the novel features thereof, are pointed out in the amended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim as our invention:

1. In control apparatus for an airborne craft having a propelling engine, in combination: means giving a first signal proportional to attack angle; means giving a second signal proportional to engine manifold pressure; means comparing said signals; and means adjusting the power of the engine whenever said signals are not in a desired relationship.

2. Aircraft control apparatus comprising, in combination: an attack angle responsive device; an attack angle selecting device; means actuated by said devices for giving a first output whenever the actual attack angle is not that selected; means adjustable to vary the effective propelling power of the craft; means giving a second output which varies with the adjustment of said adjustable means; means giving a third output which increases whenever said first output is of a first sense and decreases whenever said first output is of the opposite sense; means combining said outputs to comprise a control signal; a power setting motor; and means controlling the operation of said motor in accordance with said control signal.

3. Attack angle control apparatus comprising, in combination: an attack angle responsive device; an attack angle selecting device; means giving a first output whenever said devices are not in agreement; means giving an output which increases whenever said first output is of a first sense and decreases whenever said first output is of a second sense; means combining said outputs to comprise a control signal; a power setting motor; and means controlling the operation of said motor in accordance with said control signal.

4. In apparatus of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least one of said sliders with respect to a portion of the associated winding from varying the output thereof; elevator control means actuated in accordance with said last named output; and power control means actuated in accordance with the output of another of said dividers.

5. In apparatus of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least one of said sliders with respect to a portion of the associated winding from varying the output thereof; first flight control means actuated in accordance with said last named output; and second flight control means actuated in accordance with the output of another of said dividers.

6. In apparatus of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least certain of said sliders with respect to portions of the associated windings from varying the outputs thereof; elevator control means and bank limiting means actuated in accordance with said last named outputs; and throttle control means actuated in accordance with the output of another of said dividers.

7. In apparatus of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least one of said sliders with respect to a portion of the associated winding from varying the output thereof; turn control means controlled in accordance with said last named output; and power control means actuated in accordance with the output of another of said dividers.

8. In apparatus of the class described, in combination: a power setting motor; means giving a first output varying with deviation of actual attack angle from a selected value; means adjustable to give a second output varying in accordance with the angle of a selected glide path; means giving a third output varying in accordance with the deviation of a craft from said selected glide path; means combining said outputs to comprise a signal; and means actuating said power setting motor in accordance with said signal.

9. In apparatus of the class described, in combination: a power setting motor; means giving a first output varying with deviation of actual attack angle from a selected value; means adjustable to give a second output varying in accordance with the angle of a selected glide path; means giving a third output varying in accordance with the deviation of a craft from a selected glide path; means combining said outputs to comprise a signal; and motor control means including means operable between a first position, in which said motor is actuated in accordance with said first output, and a second position, in which said motor is actuated in accordance with said signal.

10. In apparatus for controlling the power control members of a multi-engine aircraft, in combination, means giving a first output in accordance with disagreement between a selected angle of attack and an actual angle of attack; a servomotor for operating the power control member of each said engine of said craft; and control means causing operation of said servomotors in accordance with said first output: said control means comprising means giving second outputs determined by the power control settings of said engines; means combining said first output with each of said second outputs to give signal outputs for controlling the operation of said servomotors; means giving third outputs determined by a characteristic of the operation of each of said engines; and means included in said combining means for adding to the signal outputs further components determined by said third outputs.

11. In apparatus of the class described, in combination: a pair of condition changing devices; a pair of control circuits for said devices having a common portion, including means responsive to a primary condition, and separate portions, each including means responsive to operation of one of said condition changing devices; and an equalizing circuit, having portions in common with said separate portions of said control circuits, and including means responsive to difference between two secondary conditions varied respectively as a result of operation of said condition changing devices.

12. In apparatus of the class described, in combination: a pair of throttle adjusting motors; a pair of control circuits for said motors having a common portion, including means responsive to deviation of attack angle from a selected value, and separate portions, each including means responsive to operation of one of said throttle adjusting motors; and an equalizing circuit, having portions in common with said separate portions of said control circuits, and including means responsive to difference between two engine manifold pressures varied as a result of operation of said throttle adjusting motors.

13. Attack angle control apparatus comprising, in combination: an attack angle responsive device; an attack angle selecting device; means controlled by said devices for giving first outputs whenever the actual attack angle is not that selected; means giving second outputs which vary with throttle position and elevator position respectively; means combining one of said first outputs and one of said second ouputs to comprise a first control signal; an elevator servomotor; means controlling the operation of said elevator servomotor in accordance with said first control signal; means giving an output which increases whenever said first outputs are of a first sense and decreases whenever said first outputs are of the opposite sense; means combining the other of said first outputs, the other of said second outputs, and the third output to comprise a second control signal; a throttle servomotor; and means controlling operation of said throttle servomotor in accordance with said second control signal.

14. In a device of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least one of said sliders with respect to a portion of the associated winding from varying the output thereof; elevator control means; and means energizing said last named means in accordance with said last named output and the output of another of said dividers.

15. In a device of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of at least one of said sliders with respect to a portion of the associated winding from varying the output thereof; turn control means controlled in accordance with said last named output; and elevator control means actuated in accordance with the output of another of said dividers.

16. In a device of the class described, in combination: an attack angle responsive device including a body having an axis of zero attack angle, a vane pivotally mounted for angular displacement from the direction of said axis, a plurality of voltage dividers each including a winding and a slider movable therealong, means positioning said sliders in accordance with the position of said vane throughout a range of movement, to vary the outputs of said dividers, and means preventing movement of certain of said sliders with respect to portions of the associated windings from varying the outputs thereof; elevator and turn control means controlled in accordance with said last named outputs; and means actuating said elevator control means in accordance with the output of another of said dividers.

17. In a device of the class described, in combination: control surface servomotor means; means giving a first output varying with deviation of actual attack angle from a selected value; means giving a second output whenever the actual attack angle exceeds a selected value; means for giving a third output varying in accordance with deviation of a craft from a selected glide path; means combining said outputs to comprise a signal; and control means for said servomotor means actuable to control said servomotor in accordance with said first and second outputs, or with said third output, or with said signal.

18. In a device of the class described, in combination: means giving a first signal determined by attack angle; means giving further signals determined by characteristics of operation of a plurality of engines; means comparing said signals; motor means for changing the operation of each of said engines whenever said first signal is not in a desired relationship to one of said further signals; and means simultaneously changing said further signals whenever said characteristic of operation of any engine changes.

19. In a device of the class described, in combination: means giving a first signal determined by attack angle; means giving further signals determined by the manifold pressures of a plurality of engines; means comprising said signals; and motor means for adjusting the power of each of said engines whenever said first signal is not in a desired relationship to one of said further signals.

20. In a device of the class described, in combination: means giving a first signal which varies in proportion to attack angle; means giving an adjustable second signal; means comparing said signals; motor means for continuously adjusting said second signal to assume a desired relation to said first signal; and means for controlling the elevators of a craft in proportion to the magnitude of said second signal.

21. In a device of the class described, in combination: adjustable means giving a reversible first signal determined by attack angle; adjustable means giving a reversible second signal; motor means for adjusting the magnitude and sense of said second signal; means for controlling the elevators of a craft; and means movable between a first position in which a portion of said second signal is supplied to said elevator control means and in which said motor is actuated in accordance with the sum of said signals to reduce said sum to zero, and a second position in which said elevator control means is made independent of said second signal, and in which said motor is actuated in accordance with said second signal only, to reduce said second signal to zero.

22. In a device of the class described, in combination: means giving a reversible signal varying with deviation of a controllable condition in opposite senses from a selected value; means giving a second signal variable with operation of a condition controlling device; first reversible motor means for operating said device; adjustable means giving a third signal in accordance with the adjusted condition thereof; second reversible motor means adjusting said adjustable means, whenever said first signal is not zero, in a direction determined by the sense of said deviation; motor control means for said motor means; and switch means actuable between a first condition, in which said first motor means is deenergized and said second motor means is energized in accordance with the difference between said second and third signals, and a second condition, in which said first motor means is energized in accordance with the sum of said signals and said second motor means is energized in accordance with said first signal.

23. In apparatus of the class described, in combination: means for causing an aircraft to fly at a selected attack angle and pitch attitude; means connected to said first named means for modifying the same to change said attack angle by the angle of a selected glide path; and further means connected to said first named means for simultaneously modifying the same to change said attack angle in proportion to departure of the craft from the glide path.

24. In apparatus for controlling an airborne craft, in combination: an automatic pilot for mounting in the craft, including a directional gyroscope stabilizing the direction of a control member and having a precession motor for slowly changing the direction so stabilized, means cooperating with said control member to give a first signal in accordance with the deviation of the craft from a heading with which said control member is aligned, servomotor means for adjusting the heading of the craft, and means normally controlling said servomotor means in accordance with said first signal; radio actuated means for giving a second signal determined by the displacement of the craft from a desired landing path; means connected to said automatic pilot and said radio responsive means for supplying said second signal to said controlling means to cause a change in the heading of the craft which disappears when the craft returns to the path; and means connected to said automatic pilot and to said radio actuated means for causing operation of said precession motor in accordance with said second signal throughout any interval during which said displacement persists, to cause a change in the heading of the craft which does not disappear when the craft has returned to the path.

25. In apparatus of the class described, in combination: an automatic pilot for stabilizing the attitude of a craft about its pitch axis; means responsive to departure of the craft from a desired attack angle; means temporarily modifying the operation of said automatic pilot in accordance with the response of said responsive means; and means permanently modifying the pitch attitude stabilized by said automatic pilot, in proportion to said departure, throughout any interval during which said departure persists.

26. In apparatus for controlling the power adjusting members of a multi-engined aircraft, in combination: means giving a first output in accordance with disagreement between a selected angle of attack and an actual angle of attack, a servomotor for operating the power adjusting member of each said engine of said craft, and control means causing operation of said servomotors in accordance with said first output: said control means comprising means giving second outputs determined by the settings of the power adjusting members of said engines; means combining said first output with each of said second outputs to give signal outputs for controlling the operation of said servomotors; means giving third outputs determined by a characteristic of the operation of each of said engines; and means included in said combining means for adding to said signal outputs further components determined by said third outputs.

27. In apparatus of the class described, in combination: a pair of power adjusting motors; a pair of control circuits for said motors having a common portion, including means responsive to deviation of a condition from a selected value, and a separate portion, each including means responsive to operation of one of said power adjusting motors; and an equalizing circuit, having portions in common with said separate portions of said control circuits, and including means responsive to difference between two engine operation characteristics varied as a result of operation of said power adjusting motors.

28. In a device of the class described, in combination: gyroscopic means for responding to movement of a craft about its pitch axis; first servomotor means for operating control surfaces of the craft to alter its attitude about said axis; means responsive to deviation of the craft from a selected landing path; means normally interconnecting the above named means for controlling said first servomotor means from said gyroscopic means and said responsive means; further servomotor means for altering the power settings of the engines of the craft to change the power supplied thereby; means responsive to deviation of the actual attack angle of the craft from a selected value; means interconnecting the three last named means for energizing said further servomotor means, and for further controlling said first servomotor means, in proportion to the response of said second named responsive means; and means for overridingly energizing said first servomotor means when the actual attack angle of the craft exceeds a selected value.

29. In combination: apparatus for maintaining an aircraft in level flight; radio responsive means for giving a signal adapted to modify the operation of said apparatus in accordance with departure of the aircraft from a particular path having a known slope; means operable to connect said radio responsive means in modifying relation to said apparatus; and means connected to said last named means and actuated upon operation of said last named means for further modifying the operation of said apparatus by an arbitrary amount proportional to said known slope.

30. Attack angle control apparatus, for aircraft having at least one engine, comprising, in combination: means for adjusting the effective power of the engine; balanceable means causing operation of said adjusting means in accordance with deviation of the attack angle of the craft from a desired value; and further means connected to said balanceable means and responsive thereto for causing operation of said adjusting means throughout the duration of said deviation.

31. Attack angle control apparatus, for aircraft having at least one engine, comprising, in combination: means for adjusting the power of the engine; means responsive to deviation of the attack angle of the craft from a desired value; means causing operation of said adjusting means in proportion to said deviation; and means independently causing operation of said adjusting means, at a rate determined by said deviation, throughout any interval during which said deviation persists.

32. Attack angle control apparatus, for aircraft having at least one engine, comprising, in combination: means for adjusting the manifold pressure of the engine; means responsive to deviation of the attack angle of the craft from a desired value; means causing operation of said adjusting means in proportion to said deviation; and means independently causing operation of said adjusting means, at a rate determined by said deviation, throughout any interval during which said deviation persists.

33. Attack angle control apparatus, for aircraft having at least one engine, comprising, in combination: means for adjusting the power of the engine; means responsive to deviation of the attack angle of the craft from a desired value; means causing operation of said adjusting means in proportion to said deviation; means independently causing operation of said adjusting means, at a rate determined by said deviation, throughout any interval during which the deviation persists; and means adjustable to vary said desired value.

34. In a navigating system by means of which a craft may be controlled to approach and thereafter maintain a chosen course, means for supplying a signal proportional to vertical craft displacement from a radio defined glide path, means for providing a signal corresponding to the attack angle of the craft, means for providing a signal having a predetermined fixed value dependent upon the normal landing pitch attitude angle of the craft, and means connected to receive said signals for supplying an output proportional to the algebraic sum thereof.

35. In a navigating system by means of which a craft may be controlled to approach and thereafter maintain a chosen course, means for supplying a signal proportional to vertical craft displacement from a radio defined glide path, means for limiting the maximum value of said signal to some predetermined value whereby to limit the angle of approach of the craft when operated in accordance with said signal, means for providing a signal corresponding to the attack angle of the craft, means for providing a signal having a predetermined fixed value dependent upon the normal landing pitch attitude angle of the craft, and means connected to receive said signals for supplying an output proportional to the algebraic sum thereof.

36. In a navigating system by means of which a craft may be controlled to approach and thereafter maintain a chosen course, means for supplying a signal proportional to vertical craft displacement from a radio defined glide path, means for providing a signal corresponding to the attack angle of the craft, means for providing a signal having a predetermined fixed value dependent upon the normal landing pitch attitude angle of the craft, and guidance means operated in accordance with all of said signals.

37. Means for use in controlling the flight of a craft having a positional characteristic, related to the vertical movement of the craft, which varies in value with normal flight, and which is to be changed by a predetermined amount when the craft begins to follow a sloping glide path, comprising, in combination: means for supplying a signal determined by vertical craft displacement from the glide path; means for supplying a signal determined by the value of the positional characteristic of the craft; means for supplying a signal having a value determined by the amount of the change to be made in said positional characteristic; and means connected to receive said signals for supplying an output proportional to the algebraic sum thereof.

38. In a navigating system by means of which an aircraft may be controlled to approach and thereafter maintain a chosen sloping course; means for supplying a first signal corresponding to a positional characteristic of the aircraft; means connected thereto for normally supplying an output in accordance with said first signal, means for supplying a second signal corresponding to vertical displacement of the craft from a radio defined glide path; means for providing a further signal having a predetermined fixed value dependent upon the normal landing attitude angle of the craft; and switching means connected to all said means and operable to simultaneously add said second signal and said further signal to said first signal so that the output supplied by said second named means is proportional to the algebraic sum of said signals.

39. An aircraft automatic approach system including a radio glide path receiver providing a signal proportional to the amount and sign of vertical deviation of the aircraft from a selected glide path, an elevator controller, means operatively connecting said signal to said controller for continuously controlling the pitch attitude of the craft, a condition responsive device providing a further signal proportional to the amount and sign of deviation in a flight condition related to airspeed from a selected value, an engine controlling servomotor, means for producing a temporary signal proportional to initial movement of said servomotor, and operative means for combining said three signals to control said servomotor.

40. An aircraft control system including means measuring a flight condition related to airspeed, pickoff means responsive thereto to provide a signal dependent on deviation in said condition of the craft from a selected value, means for providing a further signal dependent on vertical deviation of the aircraft from a selected flight path, means for combining said signals in such sense that deviation above the selected flight path provides a signal component which aids the signal component provided in response to deviation below the selected value of said condition, servomotor means adapted to control the position of a speed device such as a throttle, means for providing a displacement signal corresponding initially to a displacement of said servomotor from an initial position, means for gradually reducing said displacement signal to zero, and means for energizing said servomotor in accordance with the difference between said combined signals and said displacement signal.

41. An aircraft automatic approach system including a radio glide path receiver providing a signal proportional to the amount and sign of vertical deviation of the aircraft from a selected glide path, an elevator controller, means operatively connecting said signal to said controller for continuously controlling the pitch attitude of the craft, a condition responsive device providing a further signal proportional to the amount and sign of deviation in an aerodynamic condition related to airspeed from a selected value, an engine controlling servomotor, means for producing a temporary signal proportional to initial movement of said servomotor, and operative means for combining said three signals to control said servomotor.

42. In a navigating system by means of which a craft may be controlled to approach and thereafter maintain a chosen sloping course; means for supplying a first signal corresponding to a craft attitude which varies with the attack angle of the craft; means connected thereto for normally supplying an output in accordance with said first signal, means for supplying a second signal corresponding to vertical displacement of the craft from a radio defined glide path; means for providing a further signal having a predetermined fixed value dependent upon the normal landing attitude angle of the craft; and switching means connected to all said means and operable to simultaneously add said second signal and said further signal to said first signal so that the output supplied by said second named means is proportional to the algebraic sum of said signals.

References Cited in the file of this patent

UNITED STATES PATENTS

| | | |
|---|---|---|
| 1,367,839 | Tarbox | Feb. 8, 1921 |
| 2,133,285 | Dunmore | Oct. 18, 1938 |
| 2,311,642 | Crane et al. | Feb. 23, 1943 |
| 2,343,288 | Fink | Mar. 7, 1944 |
| 2,423,336 | Moseley | July 1, 1947 |
| 2,464,629 | Young | Mar. 15, 1949 |
| 2,496,294 | Kellogg | Feb. 7, 1950 |
| 2,532,936 | Peterson | Dec. 5, 1950 |
| 2,553,983 | Saxman | May 22, 1951 |